United States Patent [19]

Tsukamoto et al.

[11] Patent Number: 5,699,426

[45] Date of Patent: Dec. 16, 1997

[54] VIDEO DATA BUS COMMUNICATION SYSTEM AND METHOD

[75] Inventors: Junichi Tsukamoto, Tokyo; Koichi Goto; Shinichi Fukushima, both of Kanagawa, all of Japan

[73] Assignee: Sony Corporation, Tokyo, Japan

[21] Appl. No.: 448,254

[22] Filed: May 23, 1995

[30] Foreign Application Priority Data

May 24, 1994 [JP] Japan .................................. 6-133813

[51] Int. Cl.$^6$ .............................. H04N 7/167; H04L 9/00
[52] U.S. Cl. .................. 380/21; 380/10; 380/23; 380/25; 380/49
[58] Field of Search ........................... 380/3, 4, 5, 10, 380/21, 23, 25, 49, 50

[56] References Cited

U.S. PATENT DOCUMENTS

| | | | |
|---|---|---|---|
| 4,980,912 | 12/1990 | Welmer | 380/10 |
| 5,144,662 | 9/1992 | Welmer | 380/10 |

*Primary Examiner*—Bernarr E. Gregory
*Attorney, Agent, or Firm*—William S. Frommer; Alvin Sinderbrand

[57] ABSTRACT

A video data communication system and method are disclosed which provides for the secure transmission of video data among devices connected to a video data bus. The video data is transmitted with address information corresponding to a particular device or, alternatively, video data is encrypted and transmitted on the data bus without address information.

40 Claims, 10 Drawing Sheets

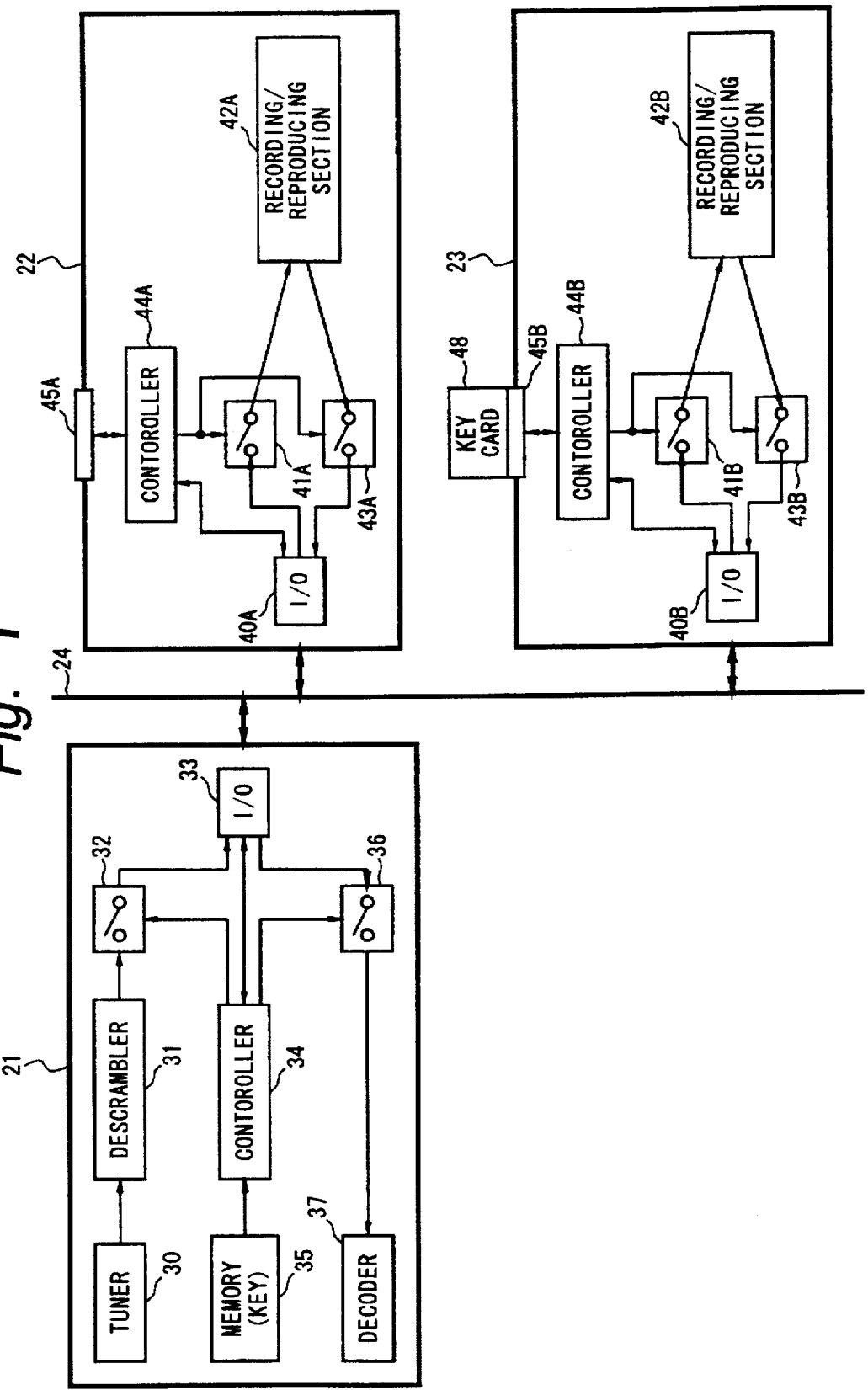

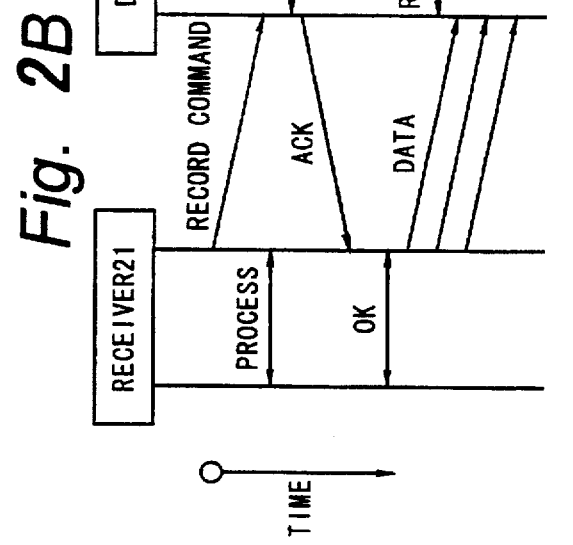
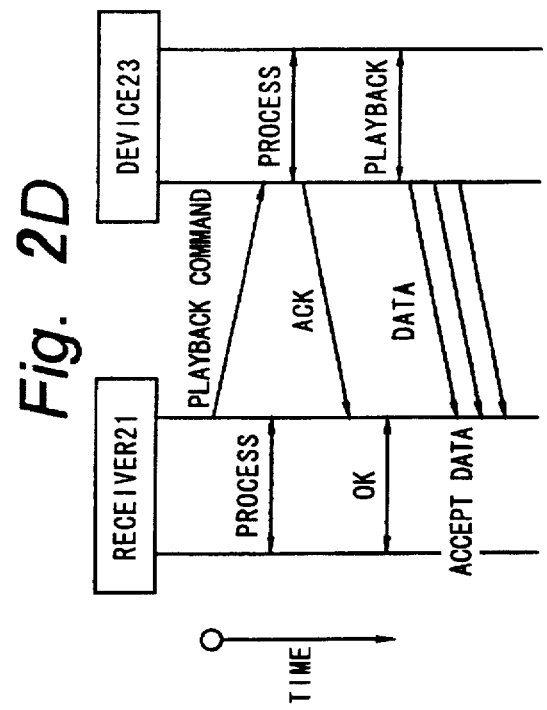
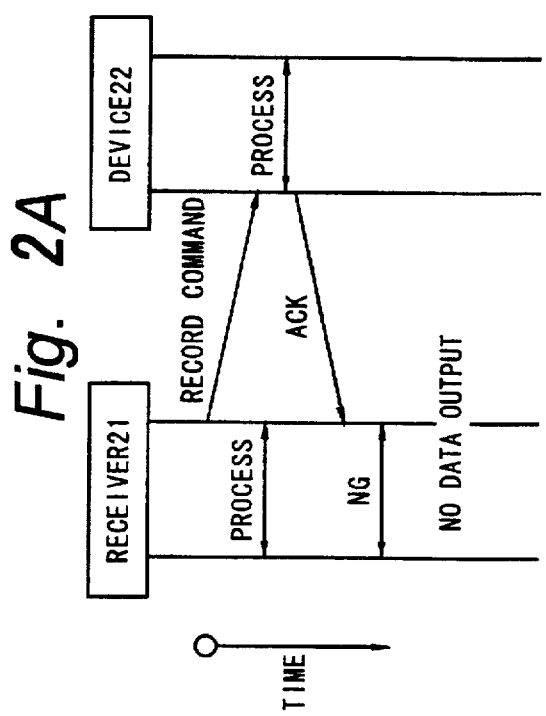
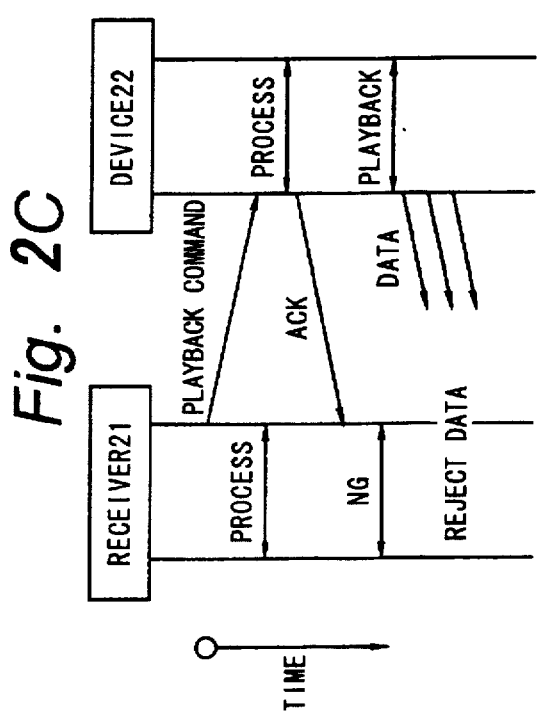

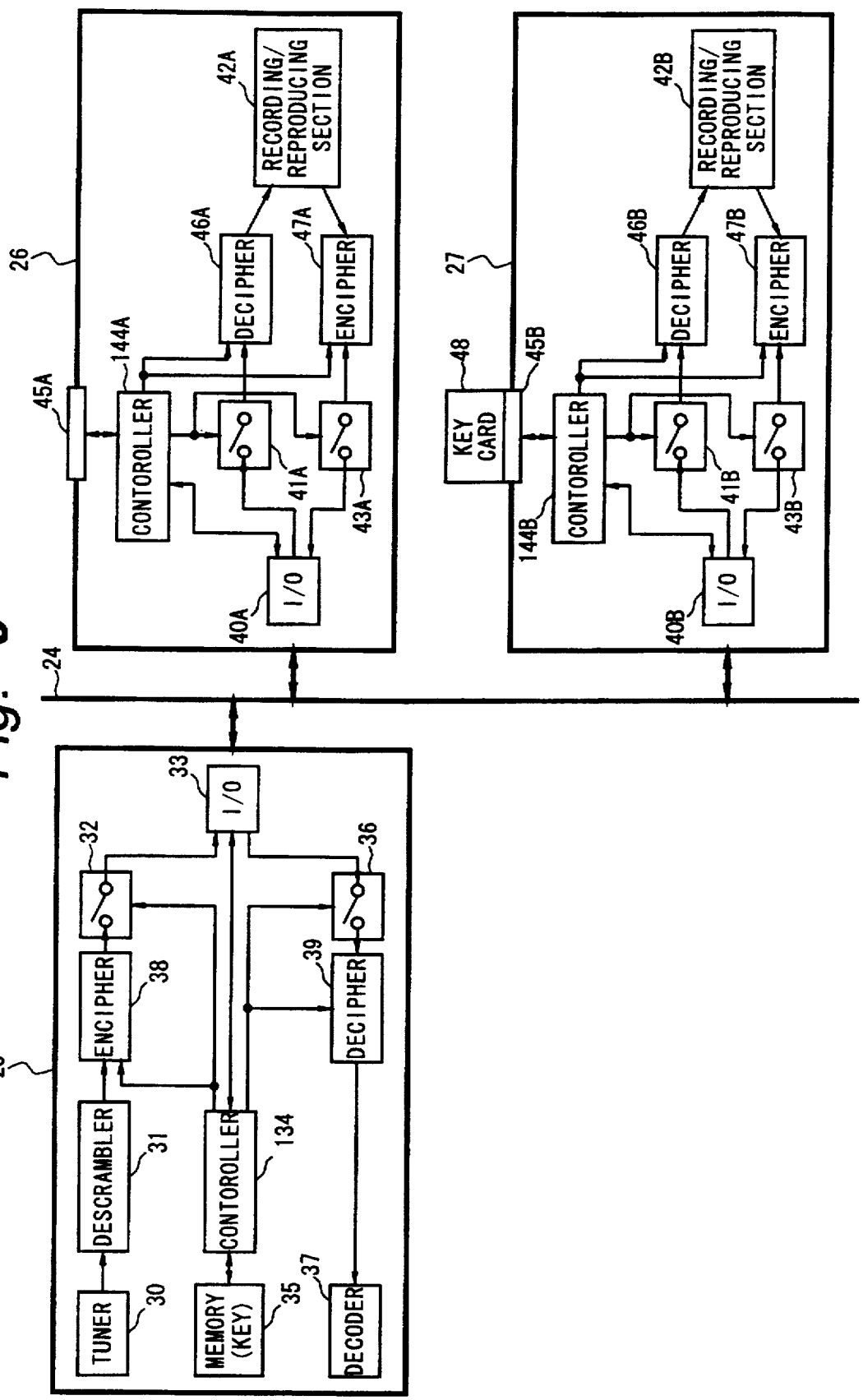

VIDEO DATA BUS COMMUNICATION SYSTEM AND METHOD

BACKGROUND OF THE INVENTION

1. Field of the Invention

This invention relates to a video data communication system and method in which video data is transmitted between devices connected to a data bus according to a protocol which ensures the security of the transmitted video data.

2. Description of the Related Art

Video data devices are connected to a common data bus to facilitate the communication of video data among the devices. Such devices include video signal receivers, video signal decoders, video signal recorders, video signal processing devices, video signal display devices, and video signal reproducing or playback devices. The data bus architecture has the advantage of being easy to implement, modify, and expand.

A video data bus system which conveys digital video data signals has the added advantage of substantially preserving the integrity of digital video signals transmitted on the bus. Such a system may transmit video data at great speeds without degrading the quality of the transmitted signal. Such a system is particularly useful for reproducing and disseminating copyrighted video data.

To preserve the value of copyrighted video data, a data bus communication system is needed that can selectively prevent certain devices connected to the bus from accessing certain video data but allowing such devices to access other video data. Also, a flexible communication protocol is needed to facilitate the secure and organized flow of video data through a video data bus system.

OBJECTS AND SUMMARY OF THE INVENTION

An object of the present invention is to provide a communication system in which the security of video data transmitted on a data bus is maintained.

Another object of the present invention is to prevent the unauthorized retrieval, reproduction, or display of video data transmitted on a video data bus.

Yet another object of the present invention is to provide a method for securely communicating video data among particular devices connected to a common video data bus.

A further object of the invention is to provide a communication system in which a device connected to a common data bus is able to address particular other devices for the transfer of video data thereamong.

A still further object of the invention is to provide a communication system in which devices connected to a common data bus can issue control signals to other devices to initiate specific types of video data transfers.

Another object of the present invention is to provide a communication system in which video data signals are transmitted on a video data bus without specifically included address signals.

In accordance with one aspect of the present invention, a method for communicating video data via a data bus between a master device and a slave device which are each coupled to the bus, comprises the steps of transmitting a slave address of the slave device and a command from the said master device to said data bus, generating, at said master device, a KEYCMD signal as a function of said command and a master security key, receiving, at said slave device from said data bus, said slave address and said command and recognizing said slave address as corresponding to said slave device, generating, at said slave device, an ACK signal as a function of said command and a slave security key, transmitting from said slave device to said data bus a master address of said master device and said ACK signal, receiving, at said master device from said data bus, said master address and said ACK signal and recognizing said master address as corresponding to said master device, comparing said KEYCMD signal generated by said master device with said ACK signal received by said master device, and executing a data transfer between said master device and said slave device if said KEYCMD signal corresponds to said ACK signal.

In accordance with another aspect of the present invention, in a system for communicating video data between at least one master device having a master address and at least one slave device having a slave address by way of a data bus coupled to said master device and to said slave device; said master device includes means for transmitting to said data bus said slave address and a command, means for generating a KEYCMD signal as a function of said command and a master security key, means for receiving from said data bus said master address and an ACK signal, means for recognizing said master address as corresponding to said master device, means for comparing said KEYCMD signal and said ACK signal, and means for receiving said video data from said data bus if said KEYCMD signal corresponds to said ACK signal; and said slave device includes means for receiving from said data bus said slave address and said command, means for recognizing said slave address as corresponding to said slave device, means for generating said ACK signal as a function of said command and a slave security key, and means for transmitting to said data bus said master address, said ACK signal, and said video data.

In accordance with still another aspect of this invention, in a system for communicating video data between at least one master device having a master address and at least one slave device having a slave address by way of a data bus coupled to said master device and to said slave device; and said master device includes means for transmitting to said data bus said slave address and a command, means for generating a KEYCMD signal as a function of said command and a master security key, means for receiving from said data bus said master address and an ACK signal, means for recognizing said master address as corresponding to said master device, means for comparing said KEYCMD signal and said ACK signal, and means for transmitting to said data bus said video data if said KEYCMD signal corresponds to said ACK signal; and said slave device includes means for receiving from said data bus said slave address, said command and said video data, means for recognizing said slave address as corresponding to said slave device, means for generating said ACK signal as a function of said command and a slave security key, and means for transmitting to said data bus said master address and said ACK signal.

In accordance with a feature of this invention, in executing a data transfer, the data in said master device is encrypted according to an encryption key and the data in said slave device is decrypted according to said encryption key, and said slave address and said encryption key are transmitted from said master device to said data bus and said encryption key and said slave address are received at said slave device from said data bus with said slave address being recognized as corresponding to said slave device.

Alternatively, in executing a data transfer, the data in said slave device is encrypted according to an encryption key and said data in said master device is decrypted according to said encryption key, said master address and said encryption key are transmitted from said slave device to said data bus and said master address and said encryption key are received from said data bus at said master device with said master address being recognized as corresponding to said master device.

The above, and other objects, features and advantages of the present invention will become apparent from the following detailed description of illustrative embodiments when read in conjunction with the accompanying drawings in which the same components are identified by the same reference numerals.

BRIEF DESCRIPTION OF THE DRAWINGS

FIG. 1 is a schematic diagram of a video data communication system according to a first embodiment of the present invention;

FIGS. 2(a)-(d) are process timing diagrams to which reference will be made in explaining the operation of the video data communication system of FIG. 1;

FIG. 5 is a schematic diagram of a video data communication system according to a second embodiment of the present invention;

DETAILED DESCRIPTION OF THE PREFERRED EMBODIMENTS

Figure 3A:
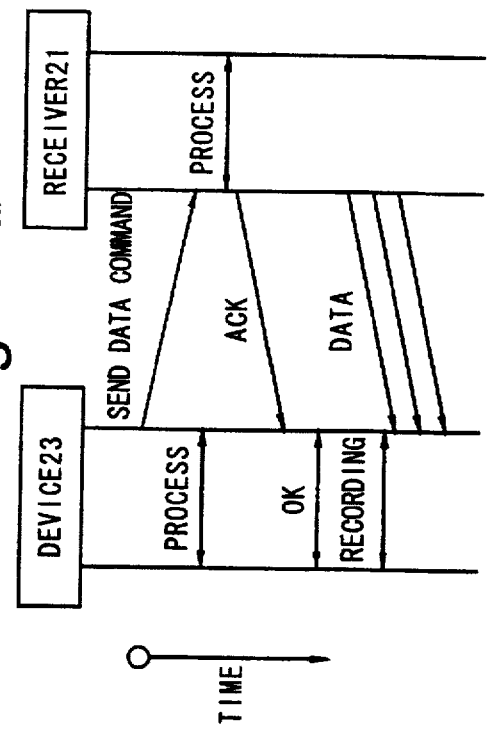
FIGS. 3(a)-(d) are additional process timing diagrams to which reference will be made in explaining the operation of the video data communication system of FIG. 1.

A first embodiment of the video data communication system according to the present invention is illustrated in FIG. 1. As explained in the following, it is preferred that the video data communication system be specifically adapted to receive, process, and transmit digital video data. Nevertheless, it should be appreciated that this system can be modified to accommodate other digital data or analog signals without departing from the scope of the invention. As it is understood that the system can easily be implemented to accommodate other types of data, the following is specifically directed towards a digital video data communication system to simplify explanation of the invention.

The video data communication system is generally comprised of a receiver 21, a data bus 24, and one or more peripheral devices. The peripheral devices, depending on their particular configurations, may transmit and/or receive control signals and/or video data through data bus 24. Two such peripheral devices are illustrated in FIG. 1, specifically, a recording/reproducing device 22 and a recording/reproducing device 23. Each of receiver 21, device 22, and device 23 are connected to data bus 24 and are capable of transmitting and receiving control signals and video data through data bus 24.

Receiver 21 is suited for receiving, descrambling, and decoding an input digital video signal. Specifically, receiver 21 is comprised of a tuner 30, a descrambler 31, a switch 32, an input/output port 33, a controller 34, a memory 35, a switch 36, and a decoder 37. Preferably, the input digital video signal is a satellite broadcast digital video signal acquired by a satellite antenna system. Alternatively, the input digital video signal is acquired from any of a number of other transmission media, such as a land-based broadcast system, a cable television system, or a fiber optic network.

Tuner 30 receives an input digital video signal (not shown) and selects a particular digital video signal or channel therefrom. Preferably, tuner 30 can be controlled by a user to select among a number of different video signals. Tuner 30 is coupled to descrambler 31, and provides a selected digital video signal thereto.

Descrambler 31 descrambles a scrambled digital video signal. As is well known in the art, transmitted video signals are commonly scrambled or coded by a signal provider to prevent unauthorized reception of the video signal. Descrambler 31 descrambles, as needed, the selected digital video signal provided by tuner 30 and provides an unscrambled version of the digital video signal to switch 32. In an alternate embodiment, a direct connection (not shown) between descrambler 31 and decoder 37 is provided to carry the unscrambled signal directly to decoder 37.

Switch 32 is coupled to descrambler 31, controller 34, and input/output (I/O) port 33. In accordance with a switch signal provided by controller 34, switch 32 closes to connect descrambler 31 with I/O port 33. Switch 36 is connected to decoder 37, controller 34, and I/O port 33. In accordance with another switch signal provided by controller 34, switch 36 closes to connect decoder 37 with I/O port 33. I/O port 33 is further coupled to data bus 24 and controller 34.

Through closed switch 36, decoder 37 receives a coded digital video signal from I/O port 33. As is well known in the art, video signals are commonly compressed or otherwise coded to facilitate their transmission through a transmission medium. Decoder 37 decodes, as needed, a coded digital video signal to produce an uncoded digital video signal. Decoder 37 provides the uncoded digital video signal to a video display device (not shown) for display to a user. It is preferred that decoder 37 is adapted to decode digital video signals encoded in accordance with the Moving Picture Image Coding Experts Group (MPEG) standard.

Memory 35 is a storage device for storing one or more security keys. Memory 35 is coupled to controller 34 and stores or provides security keys and other data as required by controller 34. In response to commands provided by a user, or according to a pre-stored set of instructions, controller 34 transmits or receives address, control and data signals, through I/O port 33, to or from data bus 24. By manipulating switch signals provided to switches 32 and 36, controller 34 controls the flow of digital video data through I/O port 33. In an alternate embodiment, controller 34 further controls the operation of I/O port 33 directly with I/O port control signals and monitors data flowing through I/O port 33.

Recording/reproducing device 22 is comprised of an I/O port 40A, a switch 41A, a recording/reproducing section 42A, a switch 43A, a controller 44A, and a card port 45A. I/O port 40A is coupled to data bus 24, controller 44A, switch 41A, and switch 43A. I/O port 40A routes address, control, and data signals to and from data bus 24 and controller 44A. I/O port 40A routes data signals to switch 41A and routes data signals from switch 43A. In an alternate embodiment, address and control signals are also routed through I/O port 40A to or from switches 41A and 43A. Switch 41A is further coupled to controller 44A and section 42A. Similarly, switch 43A is further coupled to controller 44A and section 42A.

According to switch commands from controller 44A, switch 41A closes to connect I/O port 40A and section 42A. Also, according to switch commands from controller 44A, switch 43A closes to connect section 42A and I/O port 40A. Alternatively, switches 41A and 43A may be replaced with a single bi-directional switch (not shown) controlled by controller 44A and connecting I/O port 40A and section 42A.

Recording/reproducing section 42A records data supplied through switch 41A. Section 42A reproduces prerecorded data and supplies the reproduced data to switch 43A. Preferably, section 42A is a digital video tape recording/reproducing device (VTR).

Card port 45A is adapted to mechanically, electronically, or otherwise engage a key card 48 and to obtain security key data or other information therefrom. Key card 48, which is shown engaged in device 23 in FIG. 1, comprises an active or passive device, as is well known in the art. Card port 45A is coupled to controller 44A and facilitates the communication of signals between controller 44A and an engaged key card. While a key card is not installed in card port 45A, card port 45A responds to signals from controller 44A by returning a signal that is not a valid security key.

In response to commands provided by a user, or according to a pre-stored set of instructions controller 44A transmits to or receives from data bus 24, through I/O port 40A, address, control and data signals. By manipulating switch signals provided to switches 41A and 43A, controller 44A controls the flow of digital video data through I/O port 40A. In an alternate embodiment, controller 44A may control the operation of I/O port 40A directly with I/O port control signals and monitor data flowing through I/O port 40A.

As illustrated, device 23 is substantially the same as device 22, like elements being denoted by like reference numerals with the exception of the terminating letter A and B. Key card 48, shown attached to card port 45B of device 23, stores a valid security key corresponding to a security key stored in memory 35.

Operation of the first embodiment of the video data communication system will be described below. One of the most important features of this first embodiment is that each signal transmitted via data bus 24 is accompanied by an address signal corresponding to an address of a particular device, each device attached to data bus 24 having at least one address. Communication of signals between selected devices includes communication of an address of the device intended as the recipient of the transmitted signal. Each device connected to data bus 24 reads or writes, as appropriate, signals on data bus 24 when the device detects its own address on the bus. Signals accompanying addresses for other devices are ignored. In this manner, data are securely transferred between a transmitting device and a selected destination device.

This communication protocol allows for many different sequences of signal transfer between devices connected to data bus 24. Examples of these signal transfer sequences, implemented in different modes of operation of the present invention, will be described in detail below. In one mode of operation, broadcast digital video data signals are received by receiver 21 and transmitted to data bus 24 for display by a display device (not shown), for recording by a recording device, or for other signal processing. In another mode, prerecorded video data are reproduced by a peripheral device and transmitted to a decoding device for decoding and subsequent display. In still another mode, prerecorded video data are reproduced by one peripheral device and transmitted to another peripheral device which records the video data.

In a first broadcast display mode, receiver 21 receives a broadcast signal and suitably processes it for display by a video display (not shown). Tuner 30 selectively receives a broadcast signal and supplies the signal to descrambler 31. Descrambler 31 descrambles the broadcast signal and provides a descrambled version of the signal to switch 32. Controller 34 outputs switch signals that cause switches 32 and 36 to close and outputs I/O port control signals to cause I/O port 33 to couple switches 32 and 36 together. The descrambled video signal propagates through switch 32, I/O port 33, and switch 36, to decoder 37. Decoder 37 decodes the descrambled video signal and supplies the decoded signal to a video display (not shown). When a direct connection between descrambler 31 and decoder 37 is provided, the descrambled signal is supplied directly to decoder 37, bypassing switch 32, switch 36, and I/O port 33.

Figure 9:
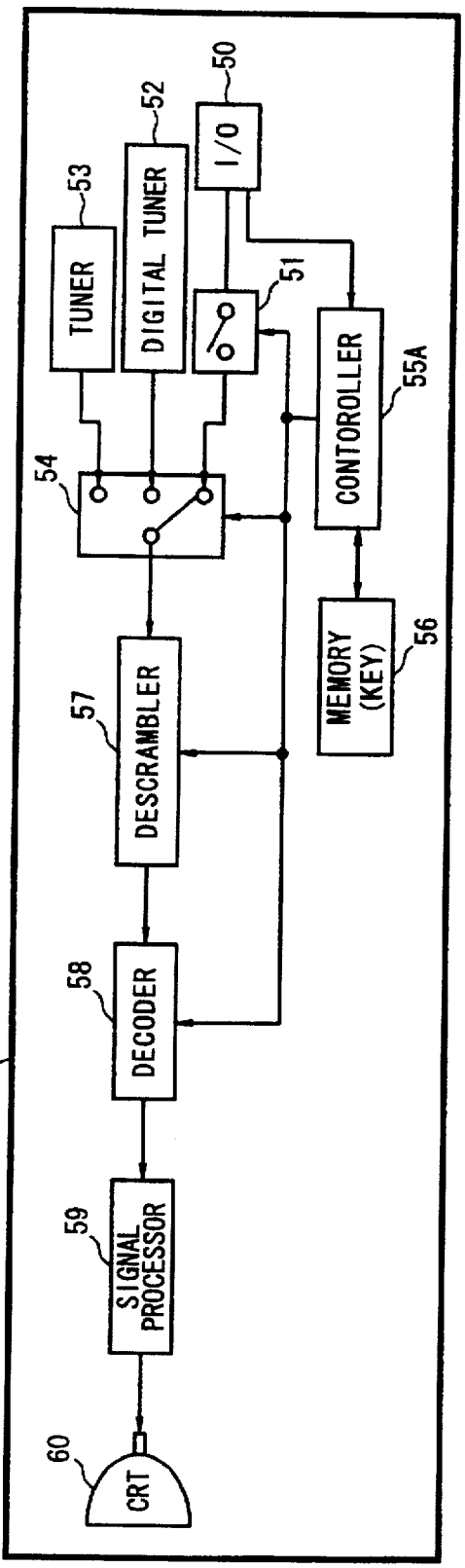
FIG. 9 is a schematic diagram of a display device compatible with the video data communication system of FIG. 1.

In a second broadcast display mode, receiver 21 receives a broadcast video signal and supplies the broadcast signal to a display device (not shown) connected to data bus 24. An example of such a display device is illustrated in FIG. 9 and will be described in detail in a later section. As in the first broadcast display mode, tuner 30 selectively receives a broadcast signal and provides the signal to descrambler 31. Descrambler 31 descrambles the broadcast video signal to produce a descrambled video signal. Controller 34 issues an address signal corresponding to a selected display device and a display command, and appropriately manipulates I/O port 33 to route the address signal and display command to data bus 24.

The display device (not shown in FIG. 1) reads the address on data bus 24, recognizes the address as its own, and reads the accompanying display command from data bus 24. The display device processes the display command to generate an ACK signal and transmits an address of receiver 21 along with the ACK signal to data bus 24. The address and ACK signal supplied by the display device are received by controller 34 via I/O port 33.

Controller 34 retrieves a security key from memory 35 and generates a KEYCMD signal as a function of the display command and the retrieved security key. The KEYCMD signal is then compared to the received ACK signal. If the ACK signal is equal to the KEYCMD signal, then controller 34 transmits an address corresponding to the display device to data bus 24. Controller 34 also issues a switch command to switch 32, causing it to close, and an I/O port control signal to I/O port 33, causing it to couple switch 32 with data bus 24. Descrambled video signal transmitted from descrambler 31 propagates through switch 32 and I/O port 33 to data bus 24.

The address signal on data bus 24 is recognized by the display device and the subsequently transmitted video data are received, processed, and displayed. Other peripheral devices connected to data bus 24 do not read the video data present on the bus if the address signal does not correspond to one of their own respective addresses.

In a recording mode of operation, receiver 21 receives a broadcast signal and transmits the broadcast signal via data bus 24 to a particular peripheral device which records the signal. Controller 34 configures I/O port 33 to couple controller 34 with data bus 24 and then transmits an address of a particular recording device along with a record command to data bus 24. Assuming, for example, that the address transmitted corresponds to an address of device 22, controller 44A, through I/O port 40A, reads the address on data bus 24, recognizes the address as its own, and reads the accompanying record command from data bus 24. Controller 44A processes the record command to generate an acknowledge (ACK) signal.

Specifically, controller 44A polls card port 45A for a security key and generates an ACK signal as a function of the received record command and the signal returned by card port 45A. Controller 44A then transmits an address of receiver 21 and the ACK signal via I/O port 40A to data bus 24. The address and ACK signal supplied by device 22 are received by controller 34 via I/O port 33.

Controller 34 retrieves a security key from memory 35 and generates a KEYCMD signal as a function of the record command and the retrieved security key. The KEYCMD signal is then compared to the received ACK signal. If the ACK signal is equal to the KEYCMD signal, then controller 34 transmits an address signal of the particular recording device to data bus 24 through I/O port 33 and configures switch 32 and I/O port 33 for the transmission of descrambled video data from descrambler 31 to data bus 24 to initiate the transfer of video data. If the ACK signal is not equal to the KEYCMD signal, then controller 34 issues a switch command signal, causing switch 32 to open, to prevent the flow of descrambled broadcast video data to data bus 24.

Since, as illustrated in FIG. 1, card port 45A of device 22 is not coupled to a card key containing a correct security key, controller 44A will generate an ACK signal which is not equal to the KEYCMD signal produced by controller 34 and no video data transfer will occur. Thus, the supply of descrambled broadcast video data to a particular recording device depends upon the installation of an appropriate key card in the card port of the particular device.

When device 23 is selected to record broadcast video data, controller 34 outputs an address of device 23 to data bus 24 through I/O port 33 along with a record command. Controller 44B, through I/O port 40B, reads the address on data bus 24, recognizes the address signal as its own and reads the accompanying record command. Controller 44B retrieves a security key from key card 48 via card port 45B. Controller 44B generates an ACK signal as a function of the received record command and the retrieved security key. Controller 44B transmits an address of receiver 21 and the ACK signal to data bus 24 through I/O port 40B.

As above, controller 34 reads the address signal and the ACK signal, generates a KEYCMD signal, and compares the ACK and KEYCMD signals. If the security key contained in key card 48 corresponds to the security key contained in memory 35, the ACK signal and the KEYCMD signal are equal. Meanwhile, controller 44B supplies a switch control signal to switch 41B, causing it to close, thereby connecting I/O port 40B with recording/reproducing section 42B. Further, I/O port 40B is configured to route video data from data bus 24 to section 42B. After verifying that the two security keys correspond, controller 34 facilitates the transmission of an address of device 23 and descrambled broadcast video data to device 23.

Controller 44B, through I/O port 40B, reads the address on data bus 24 and recognizes the address signal as its own. The accompanying descrambled video data on data bus 24 is retrieved and passed through I/O port 40B and switch 41B to section 42B for recording. As a result, recording devices having the selected address and provided with a key card 48 having the correct security key retrieve and record video data supplied by receiver 21.

In a playback mode of operation, receiver 21 initiates the playback of prerecorded video data from a peripheral device. Controller 34 transmits an address signal, corresponding to an address of a particular peripheral device, along with a playback command to data bus 24 through I/O port 33. Assuming, for example, that the address signal corresponds to an address of device 22, controller 44A, through I/O port 40A, reads the address on data bus 24, recognizes the address as its own, and reads the accompanying playback command from data bus 24. As described previously, controller 44A generates an ACK signal as a function of the playback command and a signal provided by card port 45A. Controller 44A then transmits an address of receiver 21 and this ACK signal via I/O port 40A to data bus 24. Controller 44A also issues a switch control signal to switch 43A, causing it to close, and configures I/O port 40A to connect data bus 24 and switch 43A.

Controller 34, through I/O port 33, reads the address on data bus 24, recognizes the address as its own, and reads the accompanying ACK signal. Controller 34 retrieves a security key from memory 35 and generates a KEYCMD signal as a function of the playback command and the retrieved security key. The received ACK signal is compared to the KEYCMD signal and, if they are equal, controller 34 issues a switch control signal to switch 36, causing it to close, and issues an I/O port control signal to I/O port 33, causing it to route signals from data bus 24 to switch 36. However, if the ACK signal does not equal the KEYCMD signal, then controller 34 issues a switch control signal which causes switch 36 to open.

Since device 22, as shown in FIG. 1, is not engaged with a key card having a correct security key, the ACK signal it produces will not be equivalent to the KEYCMD signal produced by controller 34. Even though recording/reproducing section 42A may output prerecorded video data to data bus 24 via switch 43A and I/O port 40A, the data will not reach decoder 37, since switch 36 will have been opened.

In the case where controller 34 initially issues an address corresponding to device 23, controller 44B reads and recognizes the address, reads the accompanying playback command, and polls card port 45B. Key card 48, having a security key corresponding to that stored in memory 35, supplies the security key to controller 44B through card port 45B. Controller 44B generates an ACK signal as a function of the received playback command and the security key received from key card 48. The ACK signal and the address of receiver 21 are transmitted via data bus 24 to controller 34 and switch 43B is closed. Controller 34 reads and recognizes the address, reads the accompanying ACK signal, and generates a KEYCMD signal as a function of the playback command and a security key obtained from memory 35. In this instance, the ACK signal and the KEYCMD signal are equal, and accordingly, controller 34 causes switch 36 to close.

Controller 44B outputs an address of receiver 21 and recording/reproducing section 42B outputs a prerecorded video data signal to data bus 24. Controller 34 reads and recognizes the address. The accompanying video data signal is retrieved from data bus 24 and supplied through I/O port 33 and switch 36 to decoder 37. Decoder 37 decodes the prerecorded video data signal and supplies the decoded signal to a video display device (not shown). Receiver 21 thus decodes data reproduced by a peripheral device in which a key card having a correct security key is installed.

The signal processing and exchange of messages in receiver-initiated data transfers is summarized in FIGS. 2(a)–(d). In each of FIGS. 2(a)–(d), the time axis runs positive in the direction indicated by the arrow. Although not explicitly mentioned in the following discussion, it should be understood that each communication between devices includes an address of the device to which the communication is being sent.

FIG. 2(a) illustrates the interaction between receiver 21 and device 22 of FIG. 1 when receiver 21 initiates video data recording. In FIG. 2(a) receiver 21 first issues a record command to device 22. Receiver 21 then processes the record command in conjunction with a security key retrieved from memory 35 to produce a KEYCMD signal. Device 22 receives the record command and similarly processes it in conjunction with a security key retrieved from card port 45A to produce an ACK signal. Device 22 then transmits the ACK signal to receiver 21. Receiver 21 compares the received ACK signal with the KEYCMD signal to determine if they are equal. Since a key card having a correct security key is not installed in device 22, the KEYCMD signal and the ACK signal are not equal. As a result, receiver 21 determines that the ACK signal is "no good" (NG) and no data is output by receiver 21.

In FIG. 2(b), receiver 21 transmits a record command to device 23. As in the manner previously described, both receiver 21 and device 23 process the recording command to produce, respectively, a KEYCMD signal and an ACK signal. Device 23 transmits the ACK signal to receiver 21. Receiver 21 compares the KEYCMD signal and the received ACK signal. Since device 23 is engaged with a key card having a correct security key, the ACK signal and the KEYCMD are equal. Receiver 21 determines that the ACK signal is thus "OK" and initiates the transmission of video data to device 23. Device 23 records the video data it receives.

FIGS. 2(c) and 2(d) illustrate the sequence of steps which occur when receiver 21 issues a playback command to a peripheral device. In FIG. 2(c), receiver 21 transmits a playback command to device 22. Receiver 21 processes the playback command in conjunction with a security key retrieved from memory 35 to produce a KEYCMD signal. Device 22 processes the received playback command in conjunction with a security key retrieved from card port 45A to produce an ACK signal. Device 22 transmits the ACK signal to receiver 21. Receiver 21 compares the KEYCMD signal with the received ACK signal to determine if they are equal. Since a key card containing a correct security key is not installed in device 22, the ACK signal is not equal to the KEYCMD signal. Accordingly, receiver 21 determines that the ACK signal is "no good" (NG). Nonetheless, device 22 reproduces a prerecorded video signal and transmits the reproduced video data to receiver 21. Receiver 21 rejects the video data.

In FIG. 2(d), receiver 21 transmits a playback command to device 23. Receiver 21 process the playback command, as before, to produce a KEYCMD signal. Device 23 processes the received playback command in conjunction with a security key retrieved from card port 45B to produce an ACK signal. Device 23 transmits this ACK signal to receiver 21. Receiver 21 compares the KEYCMD signal to the received ACK signal to determine if they are equal. Since key card 48 is engaged in device 23 and key card 48 contains a valid security key, the ACK signal and the KEYCMD signal are equal. Accordingly, receiver 21 determines that the ACK signal is "OK". Device 23 reproduces a prerecorded video signal and transmits the reproduced video data to receiver 21. Receiver 21 accepts the video data from device 23 and decodes it, as described with reference to FIG. 1.

The signal processing and exchange of messages in peripheral device-initiated data transfers is summarized in FIGS. 3(a)–(d). In each of FIGS. 3(a)–(d), the time axis runs positive in the direction indicated by the arrow. Each communication between the devices includes an address of the device to which the communication is being sent.

Figure 3C:
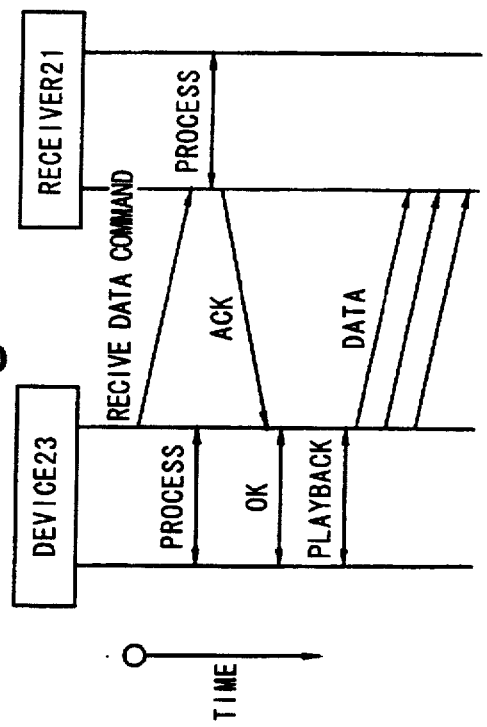

FIGS. 3(a) and 3(c) illustrate the interaction between device 22 and receiver 21 of FIG. 1 when device 22 initiates the transfer of video data. In FIG. 3(a), device 22 first issues a send data command to receiver 21. Device 22 then processes the send data command in conjunction with a security key retrieved from card port 45A to produced a KEYCMD signal. Receiver 21 receives the send data command and similarly processes it in conjunction with a security key retrieved from memory 35 to produce an ACK signal. Receiver 21 then transmits the ACK signal to device 22. Device 22 compares the received ACK signal with the KEYCMD signal to determine if they are equal. Since a key card having a correct security key is not installed in device 22, the KEYCMD signal and the ACK signal are not equal. As a result, device 22 determines that the ACK signal is "no good" (NG). Nonetheless, receiver 21 attempts to transmit broadcast video data to device 22. Device 22 rejects the video data.

In FIG. 3(c), device 22 first transmits a receive data command to receiver 21. Device 22 then processes the receive data command in conjunction with a security key retrieved from card port 45A to produce a KEYCMD signal. Receiver 21 receives the receive data command and similarly processes it in conjunction with a security key retrieved from memory 35 to produce an ACK signal. Receiver 21 then transmits the ACK signal to device 22. Device 22 compares the received ACK signal with the KEYCMD signal to determine if they are equal. Since a key card having a correct security key is not installed in device 22, the KEYCMD signal and the ACK signal are not equal. As a result, device 22 determines that the ACK signal is "no good" (NG) and no data is output by device 22.

Figure 3B:
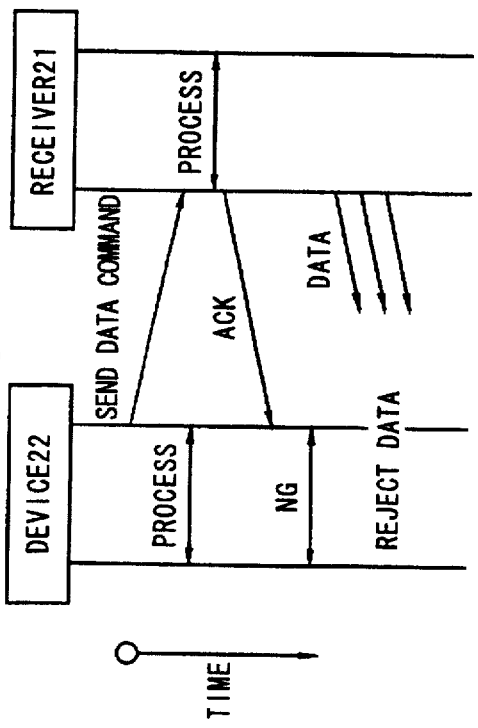
Figure 3D:
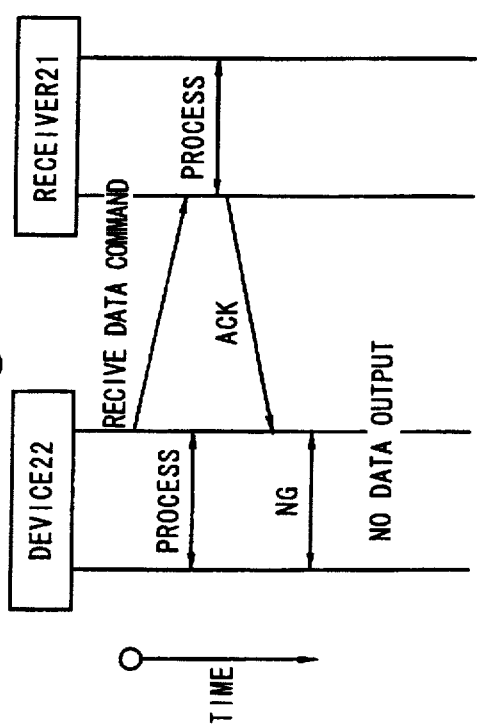

FIGS. 3(b) and 3(d) each illustrate the sequence of operations that occur when device 23 issues a command to receiver 21. In FIG. 3(b), device 23 first transmits a send data command to receiver 21. Device 23 processes the send data command in conjunction with a security key retrieved from card port 45B to produce a KEYCMD signal. Receiver 21 processes the send data command in conjunction with a security key retrieved from memory 35 to produce an ACK signal. Receiver 21 then transmits the ACK signal to device 23. Device 23 compares the KEYCMD signal with the received ACK signal to determine if they are equal. Since key card 48 is engaged in device 23 and key card 48 contains a valid security key, the ACK signal and the KEYCMD signal are equal. Accordingly, device 23 determines that the ACK signal is "OK". Receiver 21 transmits video data to device 23 which records the video data.

In FIG. 3(d), device 23 first transmits a receive data command to receiver 21. Device 23 processes the receive data command in conjunction with a security key retrieved from card port 45B to produce a KEYCMD signal. Receiver 21 processes the receive data command in conjunction with a security key retrieved from memory 35 to produce an ACK signal Receiver 21 then transmits the ACK signal to device 23. Device 23 compares the KEYCMD signal with the received ACK signal to determine if they are equal. Since key card 48 is engaged in device 23 and key card 48 contains a valid security key, the ACK signal and the KEYCMD signal are equal. Accordingly, device 23 determines that the ACK signal is "OK". Device 23 reproduces a prerecorded video signal and transmits the reproduced video data to receiver 21. Receiver 21 accepts the video data from device 23 and processes it, as described above.

In a dubbing mode, two peripheral devices, each installed with a key card having the same security key, reproduce and record, respectively, prerecorded video data. A master peripheral device initiates a video data transfer by transmitting to data bus 24 an address of a slave peripheral device along with a record command or a playback command. As described in the preceding, the slave device reads and recognizes the address, configures itself according to the command, and returns an address and an ACK signal. As also described in the preceding, the master device reads and recognizes the address and processes the ACK signal to determine its validity. If the ACK signal is "OK" then a data transfer according to the command is executed; otherwise, no data transfer occurs.

Figure 4:
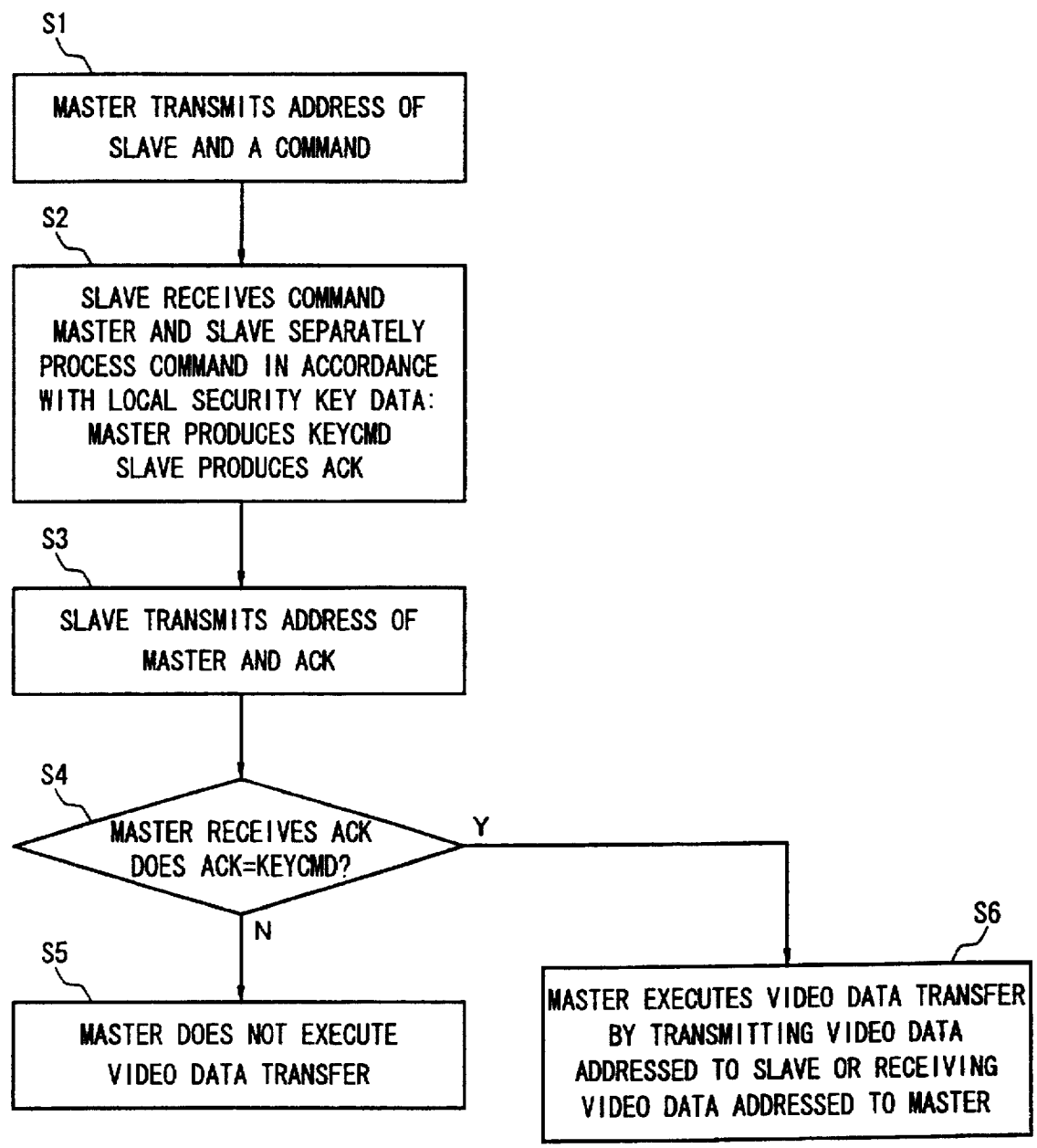
FIG. 4 is a flow diagram to which reference will be made in explaining the general sequence of communication and processing conducted by the video data communication system of FIG. 1.

The communication protocol of the apparatus of FIG. 1 is summarized in the flow diagram of FIG. 4. For ease of explanation, the term "Master" is employed to indicate the device which initiates a data transfer. The term "Slave" is employed to indicate the device which is addressed by the Master.

In step S1, the Master transmits an address of the Slave and a command to data bus 24. In step S2, the Slave receives the command and the Master and the Slave separately process the command in accordance with security key data obtained locally. The Master produces a KEYCMD signal as a function of the command and its security key. The Slave produces an ACK signal as a function of the received command and its security key.

In step S3, the Slave transmits an address of the Master and the ACK signal to data bus 24. In step S4, the Master receives the ACK signal and determines whether the ACK signal is equal to the KEYCMD signal. If the two signals are not equal, then processing follows step S5; otherwise, processing follows step S6. In step S5, the Master inhibits or simply does not execute a video data transfer between the Master and the Slave. In step S6, the Master executes a video data transfer by transmitting an address of the Slave and video data to the Slave, or by receiving and recognizing its own address and receiving video data transmitted by the Slave.

A second embodiment of the video data communication system according to the present invention is illustrated in FIG. 5. Such video data communication system is comprised of a receiver 25, a data bus 24, and one or more peripheral devices. The peripheral devices may transmit and/or receive control signals and/or video data through data bus 24. Two such peripheral devices are illustrated in FIG. 5, specifically, a recording/reproducing device 26 and a recording/reproducing device 27. Each of receiver 25, device 26, and device 27 is connected to data bus 24 and is capable of transmitting and receiving control signals and video data through data bus 24.

Receiver 25 is suited for receiving, descrambling, enciphering, deciphering, and decoding an input digital video signal. Specifically, receiver 25 is comprised of a tuner 30, a descrambler 31, a switch 32, an I/O port 33, a controller 134, a memory 35, a switch 36, an encipherer 38, a decipherer 39, and a decoder 37. Elements of FIG. 5 having the same structure and function as the corresponding elements of FIG. 1 are indicated by the same reference numeral used in FIG. 1. Tuner 30 is coupled to descrambler 31. Descrambler 31 descrambles, as needed, the selected digital video signal provided by tuner 30 and provides an unscrambled version of the digital video signal to encipherer 38.

Encipherer 38 is coupled to descrambler 31, controller 134, and switch 32. Utilizing an encryption key provided by controller 134, encipherer 38 encrypts the descrambled video signal provided by descrambler 31. The encrypted video signal is provided to switch 32.

Switch 32 is further connected to controller 134 and I/O port 33. Switch 36 is coupled to controller 134, decipherer 39 and I/O port 33. I/O port 33 is further connected to data bus 24 and to controller 134.

Decipherer 39 is coupled to controller 134 and decoder 37. Decipherer 39 receives an encryption key from controller 134 to decrypt video data provided from switch 36. Decipherer 39 supplies decrypted video data to decoder 37. Decoder 37 provides uncoded digital video signal data to a video display device (not shown).

Controller 134 is coupled to memory 35. In response to commands provided by a user, or according to a prestored set of instructions, controller 134 transmits to or receives from data bus 24, through I/O port 33, address, control and data signals. By manipulating switch signals provided to switches 32 and 36, controller 134 controls the flow of digital video data through I/O port 33. In an alternate embodiment (not shown), controller 134 directly controls the operation of I/O port 33 with I/O port control signals and monitors data flowing through I/O port 33.

Controller 134 additionally controls the encryption and decryption of video data by receiver 25. Controller 134 provides an encryption key to encipherer 38 for the encryption of descrambled video data. Similarly, controller 134 provides an encryption key to decipherer 39 to decrypt the video data supplied through switch 36. As detailed below, the encryption key is either retrieved from memory 35 or from data bus 24.

Recording/reproducing device 26 is comprised of an I/O port 40A, a switch 41A, a recording/reproducing section 42A, a switch 43A, a controller 144A, a card port 45A, a decipherer 46A, and an encipherer 47A. I/O port 40A is coupled to data bus 24, controller 144A, switch 41A, and switch 43A. I/O port 40A routes address, control and data signals to and from data bus 24 and controller 144A. Switch 41A is further coupled to controller 144A and decipherer 46A. Switch 43A is further coupled to controller 144A and encipherer 47A. Controller 144A is coupled to card port 45A, decipherer 46A and encipherer 47A. Recording/ reproducing section 42A is coupled to decipherer 46A and encipherer 47A.

Decipherer 46A receives an encryption key from controller 144A and encrypted video data from switch 41A. Decipherer 46A decrypts the encrypted data according to the encryption key and provides decrypted data to section 42A. Encipherer 47A receives an encryption key from controller 144A and video data from section 42A. Encipherer 47A encrypts the video data according to the encryption key and provides the encrypted video data to switch 43A.

In response to commands provided by a user or according to a prestored set of instructions, and in dependence upon signals supplied by card port 45A, controller 144A transmits to or receives from data bus 24, through I/O port 40A, address, control and data signals. By manipulating switch signals provided to switches 41A and 43A, controller 144A controls the flow of digital video data through I/O port 40A. In an alternate embodiment (not shown), controller 144A further directly controls the operation of I/O port 40A with I/O port control signals and monitors data flowing through I/O port 40A.

As illustrated, device 27 is substantially the same as device 26, like elements being denoted by like reference numerals with the exception of the terminating letter A and B. Key card 48, which is shown attached to card port 45B of device 27, stores a valid security key corresponding to a security key stored in memory 35.

Operation of the second embodiment of the video data communication system will be described below. One of the most important features of this second embodiment is that each signal, except video data signals, transmitted via data bus 24 is accompanied by an address signal corresponding to an address of a particular device. As in the first embodiment, each device attached to data bus 24 is assigned a particular address. Video data is transmitted to data bus 24 in an encrypted form but without an address. Each device connected to data bus 24 and capable of receiving data therefrom has access to encrypted data on data bus 24. However, only devices having a correct encryption key can decrypt the encrypted video data. In this manner, encrypted video data is provided to devices connected to data bus 24 but only devices having a correct encryption key can decrypt and utilize the video data. The encryption key may be stored in each decrypting device or provided by the device supplying the encrypted data.

This communication protocol allows for many different sequences of signal transfer between devices connected to data bus 24. Examples of these signal transfer sequences, implemented in different modes of operation of the present invention, will be described in detail below. In one mode of operation, broadcast digital video data signals are received by receiver 25, encrypted, and transmitted to data bus 24 for receipt by a peripheral device which decrypts the signals and displays, records, or otherwise processes the decrypted data. In another mode, prerecorded video data are reproduced, encrypted, and transmitted by a peripheral device to a decoding device for decryption, decoding, and subsequent display. In still another mode, prerecorded video data are reproduced, encrypted, and transmitted by one peripheral device to another peripheral device which decrypts and records the video data.

Figure 11:
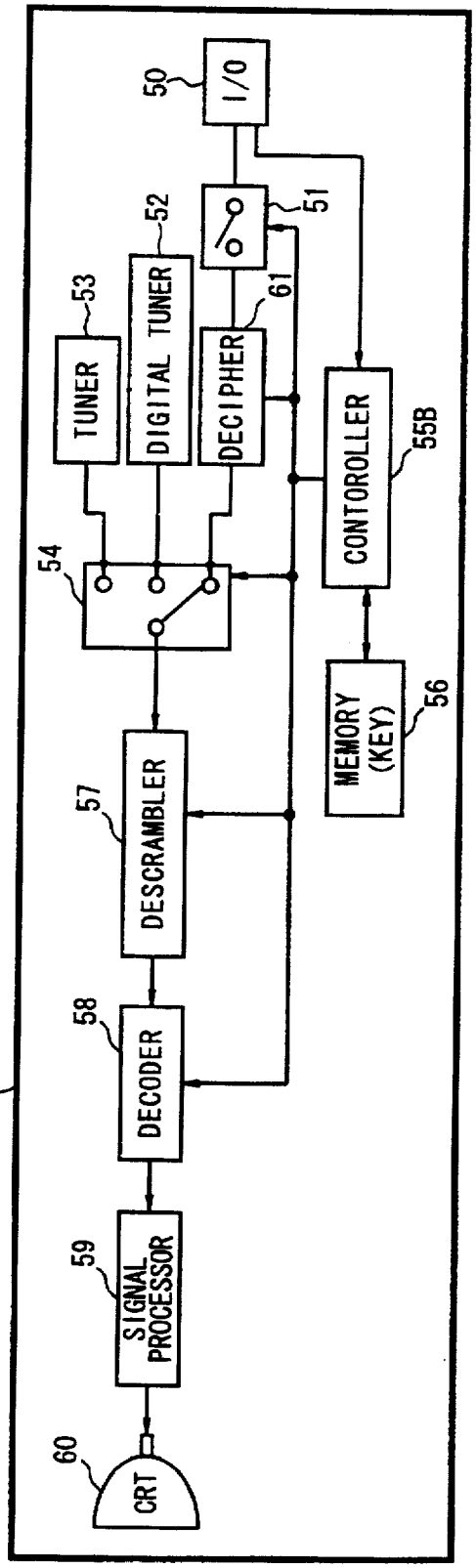
FIG. 11 is a schematic diagram of a display device compatible with the video data communication system of FIG. 5.

In a broadcast encrypt/decrypt display mode, receiver 25 receives a broadcast video signal and supplies the broadcast signal to a decryption display device (not shown on FIG. 5) connected to data bus 24. An example of such a decryption display device is illustrated in FIG. 11 and will be described in detail in a later section. Tuner 30 selectively receives a broadcast signal and provides the signal to descrambler 31. Descrambler 31 descrambles the broadcast video signal and provides a descrambled version of the signal to encipherer 38.

Controller 134 configures I/O port 33 to couple controller 134 with data bus 24 and then transmits an address of a particular display device along with a display command to data bus 24. The display device (not shown in FIG. 5) reads the address on data bus 24, recognizes the address as its own, and reads the accompanying display command from data bus 24. The display device processes the display command to generate an ACK signal and transmits an address of receiver 25 along with the ACK signal to data bus 24. The address and ACK signal supplied by the display device are received by controller 134 via I/O port 33.

Controller 134 retrieves a security key from memory 35 and generates a KEYCMD signal as a function of the display command and the retrieved security key. The KEYCMD signal is then compared to the received ACK signal. If the ACK signal is equal to the KEYCMD signal, then controller 134 transmits an address signal, corresponding to the selected display device, along with an encryption key, and appropriately manipulates I/O port 33 to route the address signal and the encryption key to data bus 24.

Controller 134 provides the encryption key to encipherer 38. Encipherer 38 encrypts the descrambled signal according to the encryption key and provides an encrypted signal to switch 32. Controller 134 also issues a switch command to switch 32, causing it to close, and an I/O port control signal to I/O port 33, causing it to couple switch 32 with data bus 24.

The encrypted video signal transmitted from encipherer 38 propagates through switch 32 and I/O port 33 to data bus 24. The address signal on data bus 24 is recognized by the display device and the subsequently transmitted encryption key is received and stored. Encrypted video signal is retrieved from data bus 24 and is decrypted according to the received encryption key, processed, and displayed. Other peripheral devices connected to data bus 24 read the video data present on data bus 24, however, only a device which possesses a correct encryption key can decrypt the data.

In an alternate embodiment, the receiver does not transmit an address along with the encryption key to the data bus and instead the encryption key is prestored in the display device. The encrypted data is still transmitted to data bus 24 without an address.

In an encrypt/decrypt recording mode of operation, receiver 25 receives a broadcast signal, encrypts the signal according to an encryption key, and transmits the key and the encrypted signal via data bus 24 to a particular peripheral device which records the signal. Specifically, controller 134 configures I/O port 33 to couple controller 134 with data bus 24 and then transmits an address of a particular recording device along with a record command to data bus 24. Assuming, for example, that the address transmitted corresponds to an address of device 26, controller 144A, through I/O port 40A, reads the address on data bus 24, recognizes the address as its own, and reads the accompanying record command from data bus 24. Controller 144A processes the record command to generate an ACK signal.

Specifically, controller 144A polls card port 45A for a security key and generates an ACK signal as a function of the received record command and the signal returned by card port 45A. Controller 144A then transmits an address of receiver 25 and the ACK signal via I/O port 40A to data bus 24. The address and ACK signal supplied by device 26 is received by controller 134 via I/O port 33.

Controller 134 retrieves a security key from memory 35 and generates a KEYCMD signal as a function of the record command and the retrieved security key. The KEYCMD signal is then compared to the received ACK signal. If the ACK signal is equal to the KEYCMD signal, then controller 134 transmits an address signal of the particular recording device along with the encryption key to data bus 24 through I/O port 33 and configures switch 32 and I/O port 33 for the transmission of encrypted video data from encipherer 38 to data bus 24 to initiate the transfer of video data. If the ACK signal is not equal to the KEYCMD signal, then controller 134 issues a switch command signal, causing switch 32 to open, to prevent the flow of encrypted broadcast video data to data bus 24.

Since, as illustrated in FIG. 5, card port 45A of device 26 is not coupled to a card key containing a correct security key, controller 144A will, in that case, generate an ACK signal which is not equal to the KEYCMD signal produced by controller 134 and no video data transfer will occur. Thus, the supply of encrypted broadcast video data to a particular recording device depends upon the installation of an appropriate key card in the card port of the particular device.

When device 27 is selected to record broadcast video data, controller 134 outputs an address of device 27 along with a record command to data bus 24 through I/O port 33. Controller 144B, through I/O port 40B reads the address on data bus 24, recognizes the address signal as its own, and reads the accompanying record command. Controller 144B retrieves a security key from key card 48 via card port 45B. Controller 144B generates an ACK signal as a function of the received record command and the retrieved security key. Controller 144B transmits an address of receiver 25 and the ACK signal to data bus 24 through I/O port 40B.

As above, controller 134 reads the address signal and the ACK signal, generates a KEYCMD signal, and compares the ACK and KEYCMD signals. If the security key contained in key card 48 corresponds to the security key contained in memory 35, the ACK signal and the KEYCMD signal are equal. Meanwhile, controller 144B supplies a switch control signal to switch 41B, causing it to close, thereby connecting I/O port 40B with decipherer 46B. Further, I/O port 40B is configured to route video data from data bus 24 to decipherer 46B. After verifying that the two security keys correspond, controller 134 facilitates the transmission to device 27 of an address of device 27 along with an encryption key followed by encrypted video data without an address.

Controller 144B, through I/O port 40B, reads the address on data bus 24, recognizes the address as its own, and reads the accompanying encryption key from data bus 24. Controller 144B supplies the encryption key to decipherer 46B. Encrypted video data on data bus 24 is retrieved and passed through I/O port 40B and switch 41B to decipherer 46B for deciphering according to the retrieved encryption key. Decipherer 46B supplies decrypted video data to section 42B for recording. As a result, recording devices having the selected address and provided with a key card 48 having a correct security key retrieve, decrypt, and record encrypted video data supplied by receiver 25.

In a playback mode of operation, receiver 25 initiates the playback of prerecorded data from a peripheral device. Controller 134 transmits an address signal, corresponding to an address of a particular peripheral device, along with a playback command to data bus 24 through I/O port 33.

Assuming, for example, that the address signal corresponds to an address of device 26, controller 144A, through I/O port 40A, reads the address on data bus 24, recognizes the address as its own, and reads the accompanying playback command from data bus 24. As described previously, controller 144A generates an ACK signal as a function of the playback command and a signal provided by card port 45A. Controller 144A then transmits an address of receiver 25 and this ACK signal via I/O port 40A to data bus 24. Controller 144A also issues a switch control signal to switch 43A, causing it to close and configures I/O port 40A to connect data bus 24 and switch 43A.

Controller 134, through I/O port 33, reads the address on data bus 24, recognizes the address as its own, and reads the accompanying ACK signal. Controller 134 retrieves a security key from memory 35 and generates a KEYCMD signal as a function of the playback command and the retrieved security key. The received ACK signal is compared to the KEYCMD signal and, if they are equal, controller 134 issues a switch control signal to switch 36, causing it to close, and issues an I/O port control signal to I/O port 33, causing it to route signals from data bus 24 to switch 36. However, if the ACK signal does not equal the KEYCMD signal, then controller 134 issues a switch control signal which causes switch 36 to open.

Since a key card having a correct security key is not installed in device 26, the ACK signal produced by device 26 will not be equivalent to the KEYCMD signal produced by controller 134. Even though recording/reproducing section 42A may output encrypted prerecorded video data to data bus 24 via switch 43A and I/O port 40A, the data will not reach decoder 37, since switch 36 will have been opened.

In the case where controller 134 initially issues an address corresponding to device 27, controller 144B reads and recognizes the address, reads the accompanying playback command, and polls card port 45B. Key card 48, having a security key corresponding to that stored in memory 35, supplies the security key to controller 144B through card port 45B. Controller 144B generates an ACK signal as a function of the received playback command and the security key received from key card 48. The ACK signal and the address of receiver 25 are transmitted via data bus 24 to controller 134 and switch 43B is closed. Controller 134 reads and recognizes the address, reads the accompanying ACK signal, and generates a KEYCMD signal as a function of the playback command and a security key obtained from memory 35. In this instance, the ACK signal and the KEYCMD signal are equal, and accordingly, controller 134 causes switch 36 to close.

Controller 144B outputs an address of receiver 25 along with an encryption key to data bus 24. Recording/ reproducing section 42B outputs a prerecorded video data signal to encipherer 47B which encrypts the signal according to the encryption key. Encipherer 47B outputs an encrypted data signal to data bus 24 via switch 43B and I/O port 40B.

Controller 134 reads and recognizes the address and retrieves the accompanying encryption key. Controller 134 provides the encryption key to decipherer 39. The encrypted video data signal is retrieved from data bus 24 and supplied through I/O port 33 and switch 36 to decipherer 39. Decipherer 39 decrypts the encrypted signal according to the encryption key and supplies a decrypted video signal to decoder 37. Decoder 37 decodes the prerecorded video data signal and supplies the decoded signal to a video display (not shown). Receiver 25 thus decrypts and decodes video data reproduced by a peripheral device in which a key card having a correct security key is installed.

In each of the above modes, it is alternately contemplated that one or more of the I/O ports has a fixed and inflexible structure which prevents its manipulation by a connected controller. In each of the above modes, it is further alternately contemplated that an address and the encryption key are not transmitted prior to the transmission of encrypted video data, but rather that the encryption key is prestored in the device which retrieves the encrypted video data.

The signal processing and interchange of messages in receiver-initiated data transfers according to the embodiment of the invention shown in FIG. 5 are diagrammatically represented in FIGS. 6(a)–(d). In each of FIGS. 6(a)–(d), the time axis runs positive in the direction indicated by the arrow. Although not explicitly mentioned in the following discussion, it should be understood that each communication between devices, with the exception of encrypted video data, includes an address of the device to which the communication is being sent.

Figure 6B:
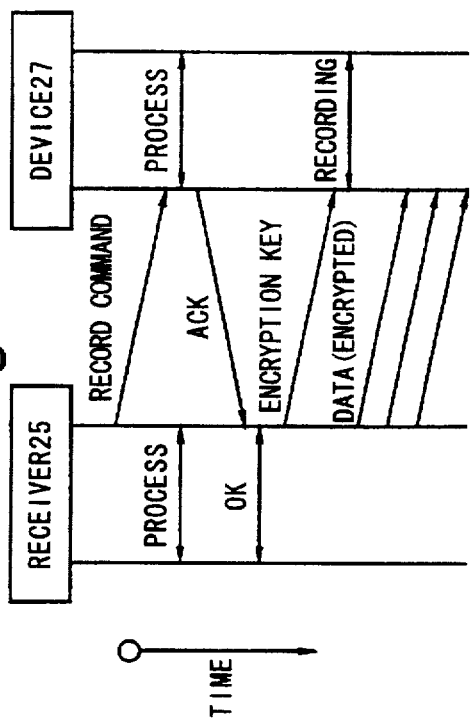
FIGS. 6(a)-(d) are process timing diagrams to which reference will be made in explaining the operation of the video data communication system of FIG. 5.
Figure 6D:
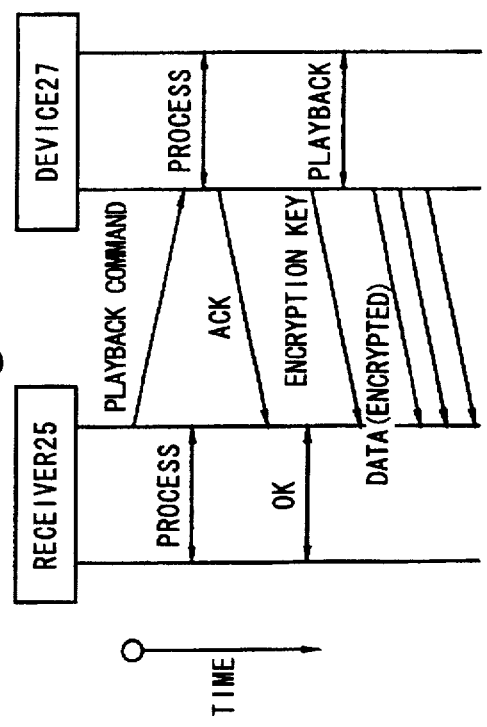
Figure 6A:
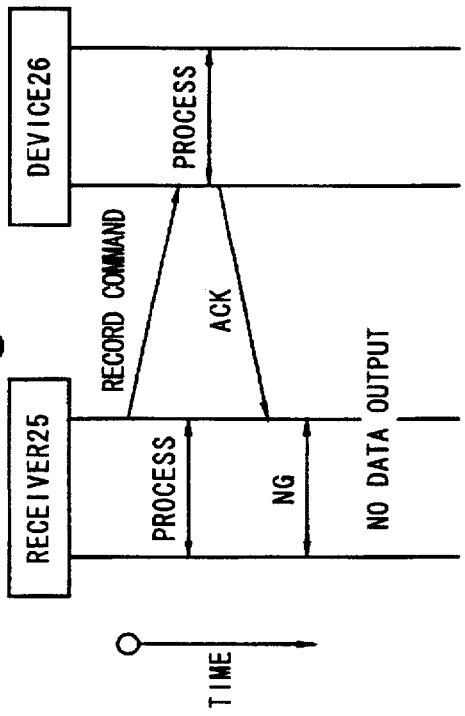

FIG. 6(a) illustrates the interaction between receiver 25 and device 26 of FIG. 5 when receiver 25 initiates video data recording. In FIG. 6(a) receiver 25 first issues a record command to device 26. Receiver 25 then processes the record command in conjunction with a security key retrieved from memory 35 to produce a KEYCMD signal. Device 26 receives the record command and similarly processes it in conjunction with a security key retrieved from card port 45A to produce an ACK signal. Device 26 then transmits the ACK signal to receiver 25. Receiver 25 compares the received ACK signal with the KEYCMD signal to determine if they are equal. Since a key card having a correct security key is not installed in device 26, the KEYCMD signal and the ACK signal are not equal. As a result, receiver 25 determines that the ACK signal is "no good" (NG) and no data is output by receiver 25.

In FIG. 6(b), receiver 25 transmits a record command to device 27. As in the manner previously described, both receiver 25 and device 27 process the recording command to produce, respectively, a KEYCMD signal and an ACK signal. Device 27 transmits the ACK signal to receiver 25. Receiver 25 compares the KEYCMD signal and the received ACK signal. Since device 27 is engaged with a key card having a correct security key, the ACK signal and the KEYCMD are equal. Receiver 25 determines that the ACK signal is thus "OK" and transmits an encryption key to device 27. Receiver 25 also sends encrypted video data to data bus 24. Device 27 retrieves, decrypts, and records the encrypted video data.

Figure 6C:
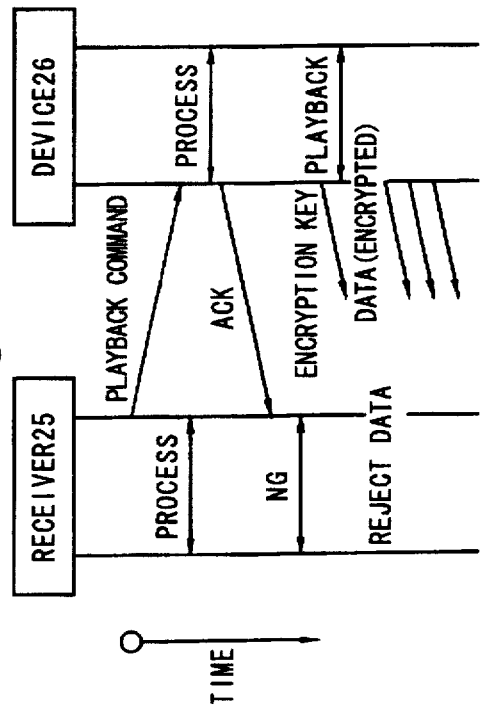

FIGS. 6(c) and 6(d) illustrate the sequence of steps which occur when receiver 25 issues a playback command to a peripheral device. In FIG. 6(c), receiver 25 transmits a playback command to device 26. Receiver 25 processes the playback command in conjunction with a security key retrieved from memory 35 to produce a KEYCMD signal. Device 26 processes the received playback command in conjunction with a security key retrieved from card port 45A to produce an ACK signal. Device 26 transmits the ACK signal to receiver 25. Receiver 25 compares the KEYCMD signal with the received ACK signal to determine if they are equal. Since a key card containing a correct security key is not installed in device 26, the ACK signal is not equal to the KEYCMD signal. Accordingly, receiver 25 determines that the ACK signal is "no good" (NG). Nonetheless, device 26 attempts to send an encryption key and encrypted reproduced video signal data to receiver 25 via data bus 24, but receiver 25 does not retrieve the key and the video data.

In FIG. 6(d), receiver 25 transmits a playback command to device 27. Receiver 25 process the playback command, as before, to produce a KEYCMD signal. Device 27 processes the received playback command in conjunction with a security key retrieved from card port 45B to produce an ACK signal. Device 27 transmits this ACK signal to receiver 25. Receiver 25 compares the KEYCMD signal to the received ACK signal to determine if they are equal. Since key card 48 is engaged in device 27 and key card 48 contains a valid security key, the ACK signal and the KEYCMD signal are equal. Accordingly, receiver 25 determines that the ACK signal is "OK". Device 27 reproduces a prerecorded video signal and transmits an encryption key and encrypted reproduced video data to receiver 25. Receiver 25 accepts the encryption key and retrieves the encrypted video data.

The signal processing and interchange of messaging in device-initiated data transfers according to the second embodiment of the invention are diagrammatically represented in FIGS. 7(a)–(d). In each of FIGS. 7(a)–(d), the time axis runs positive in the direction indicated by the arrow. Although not explicitly mentioned in the following discussion, it should be understood that each communication between devices, with the exception of encrypted video data, includes an address of the device to which the communication is being sent.

Figure 7B:
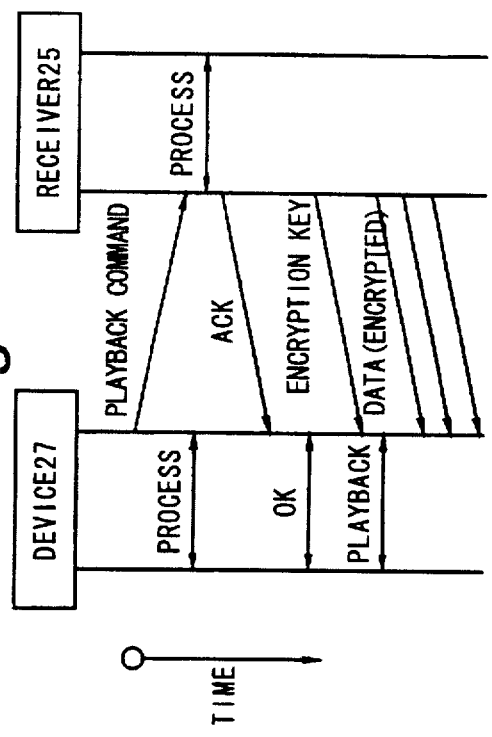
FIGS. 7(a)-(d) are additional process timing diagrams to which reference will be made in explaining the operation of the video data communication system of FIG. 5.
Figure 7D:
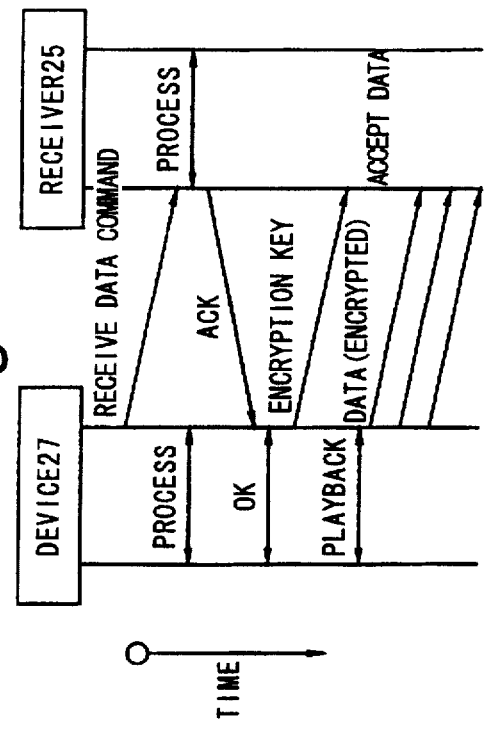
Figure 7A:
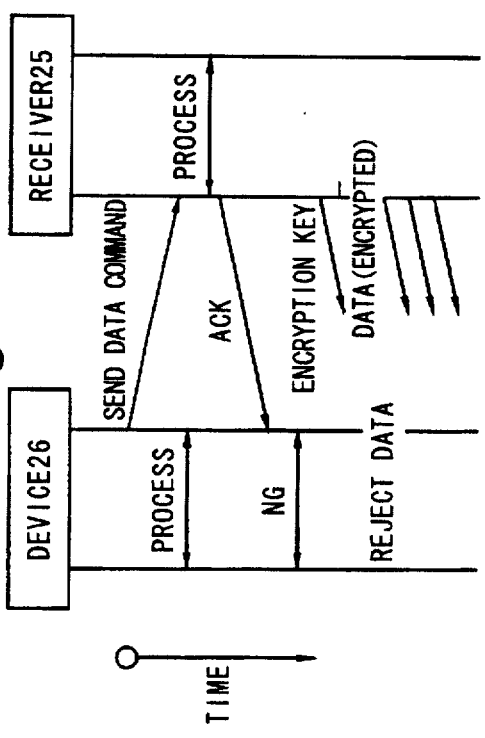
Figure 7C:
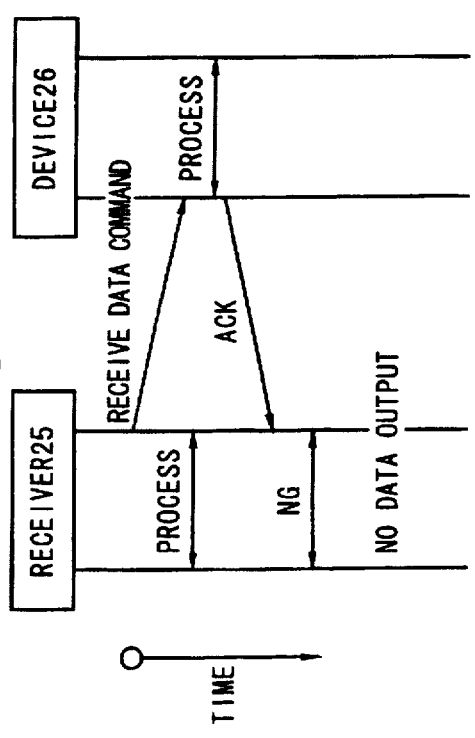

FIGS. 7(a) and 7(c) illustrate the interaction between device 26 and receiver 25 of FIG. 1 when device 26 initiates the transfer of video data. In FIG. 7(a), device 26 first issues a send data command to receiver 25. Device 26 then processes the send data command in conjunction with a security key retrieved from card port 45A to produced a KEYCMD signal. Receiver 25 receives the send data command and similarly processes it in conjunction with a security key retrieved from memory 35 to produce an ACK signal. Receiver 25 then transmits the ACK signal to device 26. Device 26 compares the received ACK signal with the KEYCMD signal to determine if they are equal. Since a key card having a correct security key is not installed in device 26, the KEYCMD signal and the ACK signal are not equal. As a result, device 26 determines that the ACK signal is "no good" (NG). Nonetheless, receiver 25 attempts to transmit an encryption key and encrypted broadcast video data to device 26 via data bus 24, but device 26 does not retrieve the encryption key nor the video data.

In FIG. 7(c), device 26 first transmits a receive data command to receiver 25. Device 26 then processes the receive data command in conjunction with a security key retrieved from card port 45A to produce a KEYCMD signal. Receiver 25 receives the receive data command and similarly processes it in conjunction with a security key retrieved from memory 35 to produce an ACK signal. Receiver 25 then transmits the ACK signal to device 26. Device 26 compares the received ACK signal with the KEYCMD signal to determine if they are equal. Since a key card having a correct security key is not installed in device 26, the KEYCMD signal and the ACK signal are not equal. As a result, device 26 determines that the ACK signal is "no good" (NG) and no data is output by device 26.

Each of FIGS. 7(b) and 7(d) illustrates the sequence of operations that occur when device 27 issues a command to receiver 25. In FIG. 7(b), device 27 first transmits a send data command to receiver 25. Device 27 processes the send data command in conjunction with a security key retrieved from card port 45B to produce a KEYCMD signal. Receiver 25 processes the send data command in conjunction with a security key retrieved from memory 35 to produce an ACK signal. Receiver 25 then transmits the ACK signal to device 27. Device 27 compares the KEYCMD signal with the received ACK signal to determine if they are equal. Since key card 48 is engaged in device 27 and key card 48 contains a correct security key, the ACK signal and the KEYCMD signal are equal. Accordingly, device 27 determines that the ACK signal is "OK". Receiver 25 transmits an encryption key and encrypted video data to device 27 which decrypts and records the video data.

In FIG. 7(d), device 27 first transmits a receive data command to receiver 25. Device 27 processes the receive data command in conjunction with a security key retrieved from card port 45B to produce a KEYCMD signal. Receiver 25 processes the receive data command in conjunction with a security key retrieved from memory 35 to produce an ACK signal. Receiver 25 transmits the ACK signal to device 27. Device 27 compares the KEYCMD signal with the received ACK signal to determine if they are equal. Since key card 48 is engaged in device 27 and key card 48 contains a correct security key, the ACK signal and the KEYCMD signal are equal. Accordingly, device 27 determines that the ACK signal is "OK". Device 27 reproduces and encrypts a prerecorded video signal and transmits the encryption key and the encrypted reproduced video data to receiver 25. Receiver 25 accepts, decrypts, and further processes the video data as described above.

In an encrypt/decrypt dubbing mode, encrypted data is communicated between two peripheral devices, such as the devices 26 and 27, each installed with a key card having the same security key. A master of such peripheral devices initiates a video data transfer by transmitting to data bus 24 an address of a slave among the peripheral devices along with a record command or a playback command. As described in the preceding, the slave device reads and recognizes the address, configures itself according to the command, and returns an address and an ACK signal.

As also described in the preceding, the master device reads and recognizes the address and processes the ACK signal to determine its validity. If the ACK signal is "OK" then a data transfer according to the command is executed; otherwise, no data transfer occurs. As part of a data transfer, the transmitting device reproduces and encrypts, according to an encryption key, prerecorded data. The encryption key is sent with the address of the receiving peripheral device to data bus 24. The other receiving peripheral device reads and recognizes the address and retrieves the encryption key. The transmitting device sends the encrypted data to data bus 24 and the receiving device retrieves, decrypts, and records the encrypted data.

Figure 8:
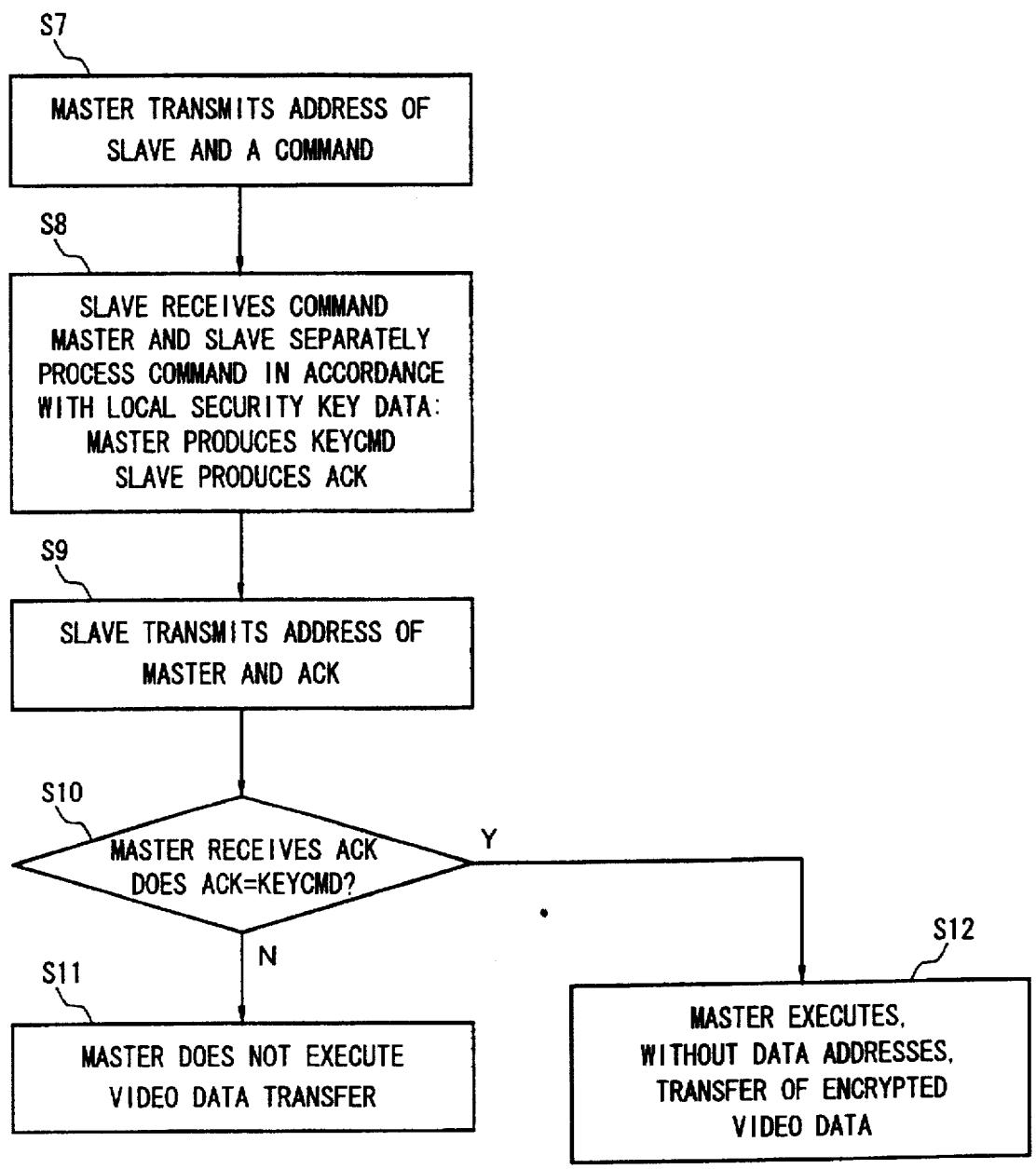
FIG. 8 is a flow diagram to which reference will be made in explaining the general sequence of communication and processing conducted by the video data communication system of FIG. 5.

The communication protocol of the apparatus of FIG. 5 is summarized in the flow diagram of FIG. 8. For ease of explanation, the term "Master" is employed to indicate the device which initiates a data transfer. The term "Slave" is employed to indicate the device which is addressed by the Master.

In step S7, the Master transmits an address of the Slave and a command to data bus 24. In step S8, the Slave receives the command and the Master and the Slave separately process the command in accordance with security key data obtained locally. The Master device produces a KEYCMD signal as a function of the command and its security key. The Slave produces an ACK signal as a function of the received command and its security key.

In step S9, the Slave transmits an address of the Master and the ACK signal to data bus 24. In step S10, the Master receives the ACK signal and determines whether the ACK signal is equal to the KEYCMD signal. If the two signals are not equal, then processing follows step S11; otherwise, processing follows step S12. In step S11, the Master inhibits or simply does not execute a video data transfer between the Master and the Slave. In step S12, the Master executes a video data transfer by transmitting an encryption key and encrypted video data to the Slave, or by receiving and retrieving an encryption key and encrypted video data transmitted by the Slave.

FIG. 9 illustrates a display device 28-1 suitable for connection to data bus 24 of the first embodiment of the invention described above with reference to FIG. 1. Display device 28-1 is comprised of a cathode-ray tube (CRT) 60, a signal processor 59, a decoder 58, a descrambler 57, a memory 56, a controller 55A, a switch 54, a tuner 53, a digital tuner 52, a switch 51, and an I/O port 50. CRT 60 and signal processor 59 are conventional devices which together comprise a conventional display apparatus. Tuner 53 is a conventional broadcast tuner which receives an unscrambled video signal. Tuner 52 is a satellite digital signal tuner which receives scrambled video data signals. Tuner 53, tuner 52 and switch 51 are coupled to inputs of switch 54 and each provides a respective video signal thereto.

I/O port 50 is coupled to data bus 24 (not shown), switch 51, and controller 55A. I/O port 50 routes data signals to switch 51 and routes address, control and data signals to controller 55A. Controller 55A is further coupled to switch 51, memory 56, switch 54, descrambler 57 and decoder 58. Memory 56 stores one or more security keys which controller 55A retrieves as needed. Controller 55A controls the state of switches 54 and 51 with switch control signals. Controller 55A can also enable or disable the operations of decoder 58 and descrambler 57.

Descrambler 57 is further coupled to the output of switch 54 and the input of decoder 58. When enabled by controller 55A, descrambler 57 descrambles video data and supplies unscrambled video data to decoder 58. When disabled by controller 55A, descrambler 57 passes video signals from switch 54 to decoder 58.

Decoder 58 is further coupled to the input of signal processor 59. When enabled by controller 55A, decoder 58 decodes video data and supplies decoded video data to signal processor 59. When disabled by controller 55A, decoder 58 passes video signals from descrambler 57 to signal processor 59.

Display device 28-1 has three modes of operation. In the first mode, controller 55A causes switch 54 to link tuner 53 with descrambler 57. Controller 55A disables descrambler 57 and decoder 58, allowing signal processor 59 and CRT 60 to display ordinary video data received by tuner 53.

In the second mode, controller 55A causes switch 54 to link tuner 52 with descrambler 57. Controller 57 enables descrambler 57 and decoder 58. Descrambler 57 descrambles a scrambled and coded video signal supplied by tuner 52 and supplies an unscrambled, though still coded, video signal to decoder 58. Decoder 58 decodes the coded signal and provides an uncoded video signal to signal processor 59 for display.

In the third mode, controller 55A reads an address signal on data bus 24 through I/O port 50. If the address corresponds to an address previously assigned to device 28-1, then controller 55A recognizes the address as such and processing proceeds as follows. Controller 55A retrieves a display command from data bus 24. Controller 55A generates an ACK signal as a function of the display command and a security key retrieved from memory 56. Controller transmits an address of the device which sent the display command along with the ACK signal to data bus 24 through I/O port 50. Controller 55A also causes switch 51 to close, connecting I/O port 50 with switch 54, and causes switch 54 to connect switch 51 with descrambler 57. Controller 55A also enables descrambler 57 and decoder 58.

Controller 55A monitors data bus 24 for another address signal corresponding to device 28-1. Upon receipt of such an address, video data is then retrieved from data bus 24 and supplied through I/O port 50, switch 51, and switch 54 to descrambler 57. Descrambler 57 descrambles, as needed, the retrieved video data and provides an unscrambled video signal to decoder 58. Decoder 58 decodes the signal and supplies an uncoded video signal to signal processor 59 for display on CRT 60.

Figure 10:
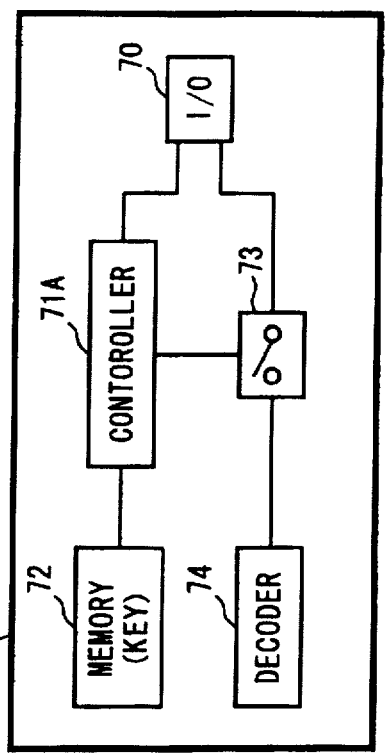
FIG. 10 is a schematic diagram of a decoding device compatible with the video data communication system of FIG. 1.

FIG. 10 illustrates a decoding device 29-1 suitable for connection to data bus 24 of the first embodiment of the invention in place of the receiver 21. Decoding device 29-1 is comprised of a memory 72, a controller 71A, an I/O port 70, a switch 73, and a decoder 74. Decoder 74 and switch 73 have the same structure and function as their counterparts decoder 37 and switch 36 of receiver 21. Controller 71A is coupled to memory 72, I/O port 70, and switch 73. Switch 73 is further connected to decoder 74 and I/O port 70. I/O port 70 is further coupled to data bus 24.

As in the processing described above, controller 71A monitors data bus 24 for an address signal of device 29-1. Upon recognizing such an address signal, controller 71A retrieves a display command from data bus 24 and generates an ACK signal as a function of the display command and a security key retrieved from memory 72. The ACK signal is transmitted with the appropriate address to data bus 24. Video data accompanied by an address of device 29-1 is retrieved and routed through I/O port 70 and switch 73 to decoder 74. Decoder 74 decodes the video signal and provides an uncoded video signal to a display (not shown).

As earlier noted, FIG. 11 illustrates a display device 28-2 suitable for connection to data bus 24 of the second embodiment of the invention. Display device 28-2 is comprised of the elements described above in connection with the display device 28-1, and which are interconnected and function in the same manner as in display device 28-1 except as described in the following. Unlike display device 28-1, display device 28-2 includes a decipherer 61 interposed between switch 51 and switch 54 and controller 55A is replaced by controller 55B. Controller 55B is additionally coupled to decipherer 61 and supplies an encryption key thereto. Decipherer 61 decrypts encrypted video data supplied from switch 51 and supplies decrypted video data to switch 54.

In accordance with the protocol of the second embodiment, controller 55B monitors data bus 24 for an address of device 28-2 and an accompanying display command. An ACK signal is generated as a function of the retrieved display command a security key retrieved from memory 56. Controller 55B then transmits an appropriate address and the ACK signal to data bus 24. Controller 55B monitors data bus 24 for the address of device 28-2 and an accompanying encryption key. Upon receipt, decipherer 51 is supplied with the encryption key, and I/O port 50 and switch 51 are configured to route encrypted data through to decipherer 61. Decipherer 61 decrypts the video data and supplies a decrypted signal suitable for subsequent processing as described with respect to device 28-1.

Figure 12:
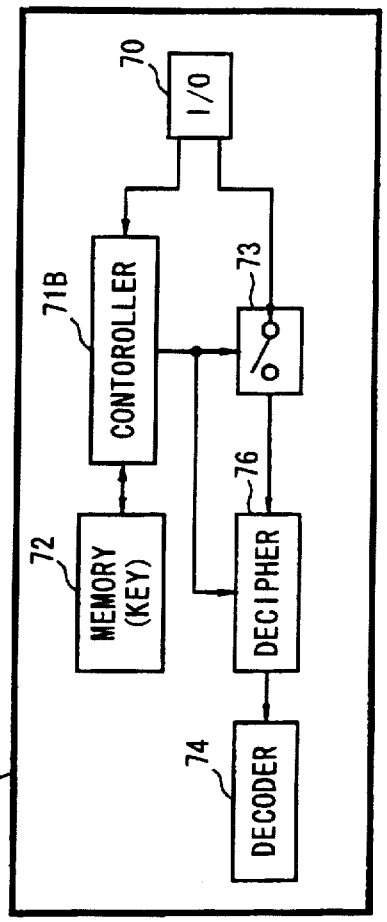
FIG. 12 is a schematic diagram of a decoding device compatible with the video data communication system of FIG. 5.

FIG. 12 illustrates a decoding device 29-2 suitable for connection to data bus 24 in place of the receiver 25 in the second embodiment of the invention. Decoding device 29-2 is comprised of the same elements as decoding device 29-1, and such elements are interconnected and function in the same manner as in decoding device 29-1 except as described in the following. Unlike decoding device 29-1, decoding device 29-2 includes a decipherer 76 interposed between switch 73 and decoder 74, and controller 71A is replaced by controller 71B. Controller 71B is additionally coupled to decipherer 76 and supplies an encryption key thereto. Decipherer 76 decrypts encrypted video data supplied from switch 73 and supplies decrypted video data to decoder 74.

As described in the process above, controller 71B monitors data bus 24 for an address signal of device 29-2. Upon recognizing such an address signal, controller 71B retrieves a display command from data bus 24 and generates an ACK signal as a function of the display command and a security key retrieved from memory 72. The ACK signal is transmitted with the appropriate address to data bus 24. An encryption key accompanied by an address of device 29-2 is retrieved by controller 71B from data bus 24. Encrypted video data supplied from data bus 24 is routed through I/O port 70 and switch 73 to decipherer 76. Decipherer 76 decrypts the encrypted video data and provides a decrypted video signal to decoder 74. Decoder 74 decodes the decrypted video signal and provides an uncoded video signal to a display (not shown).

Although illustrative embodiments of the present invention and modifications thereof have been described in detail herein, it is to be understood that this invention is not limited to these precise embodiments and modifications, and that other modifications and variations may be effected therein by one skilled in the art without departing from the scope and spirit of the invention as defined by the appended claims.

What is claimed is:

1. A method for communicating video data via a data bus between a master device and a slave device which are each coupled to said bus, comprising the steps of:

transmitting from said master device to said data bus a slave address of said slave device and a command;

generating, at said master device, a KEYCMD signal as a function of said command and a master security key;

receiving, at said slave device from said data bus, said slave address and said command and recognizing said slave address as corresponding to said slave device;

generating, at said slave device, an ACK signal as a function of said command and a slave security key;

transmitting from said slave device to said data bus a master address of said master device and said ACK signal;

receiving, at said master device from said data bus, said master address and said ACK signal and recognizing said master address as corresponding to said master device;

comparing said KEYCMD signal generated by said master device with said ACK signal received by said master device; and executing a data transfer between said master device and said slave device if said KEYCMD signal corresponds to said ACK signal.

2. The method, according to claim 1, further comprising the step of:

inhibiting a data transfer between said master device and said slave device if said KEYCMD signal does not correspond to said ACK signal.

3. The method, according to claim 2, wherein said data is unencrypted and encoded and wherein said step of inhibiting a data transfer comprises:

transmitting said data from said slave device to said data bus; and preventing said master device from decoding said data from said data bus.

4. The method, according to claim 2, wherein said step of inhibiting a data transfer comprises:

preventing said master device from transmitting said data to said data bus.

5. The method, according to claim 1, wherein said master device is a receiver and said slave device is a peripheral device.

6. The method, according to claim 5, wherein said peripheral device is a display device.

7. The method, according to claim 1, wherein said master device is a peripheral device and said slave device is a receiver.

8. The method, according to claim 1, wherein said master device is a first peripheral device and said slave device is a second peripheral device.

9. The method, according to claim 1, wherein said slave device comprises means for decoding an unencrypted coded data.

10. The method, according to claim 1, wherein said step of executing a data transfer comprises:

encrypting said data in said master device according to an encryption key; and decrypting said data in said slave device according to said encryption key.

11. The method, according to claim 10, wherein said step of executing a data transfer further comprises:

transmitting said slave address and said encryption key from said master device to said data bus; and receiving said encryption key and said slave address at said slave device from said data bus and recognizing said slave address as corresponding to said slave device.

12. The method, according to claim 10, further comprising the step of:

inhibiting a data transfer between said master device and said slave device if said KEYCMD signal does not correspond to said ACK signal.

13. The method, according to claim 12, wherein said step of inhibiting a data transfer comprises:

preventing said master device from transmitting said data to said data bus.

14. The method, according to claim 10, wherein said master device is a receiver and said slave device is a peripheral device.

15. The method, according to claim 14, wherein said peripheral device is a display device.

16. The method, according to claim 10, wherein said master device is a peripheral device and said slave device is a receiver.

17. The method, according to claim 10, wherein said master device is a first peripheral device and said slave device is a second peripheral device.

18. The method, according to claim 10, wherein said slave device comprises means for decoding a decrypted coded data.

19. The method, according to claim 1, wherein said step of executing a data transfer comprises:

encrypting said data in said slave device according to an encryption key; and decrypting said data in said master device according to said encryption key.

20. The method, according to claim 19, wherein said step of executing a data transfer further comprises:

transmitting said master address and said encryption key from said slave device to said data bus; and receiving said master address and said encryption key from said data bus at said master device and recognizing said master address as corresponding to said master device.

21. The method, according to claim 19, further comprising the step of:

inhibiting a data transfer between said master device and said slave device if said KEYCMD signal does not correspond to said ACK signal.

22. The method, according to claim 21, wherein said data is encrypted and encoded and wherein said step of inhibiting a data transfer comprises:

transmitting said data from said slave device to said data bus; and preventing said master device from decoding said data from said data bus.

23. The method, according to claim 19, wherein said master device is a receiver and said slave device is a peripheral device.

24. The method, according to claim 23, wherein said peripheral device is a display device.

25. The method, according to claim 19, wherein said master device is a peripheral device and said slave device is a receiver.

26. The method, according to claim 19, wherein said master device is a first peripheral device and said slave device is a second peripheral device.

27. The method, according to claim 19, wherein said slave device comprises means for decoding a decrypted coded data.

28. A system for communicating video data comprising:

at least one master device having a master address;

at least one slave device having a slave address;

a data bus, coupled to said master device and to said slave device;

said master device including:

means for transmitting to said data bus said slave address and a command, means for generating a KEYCMD signal as a function of said command and a master security key, means for receiving from said data bus said master address and an ACK signal, means for recognizing said master address as corresponding to said master device, means for comparing said KEYCMD signal and said ACK signal, and means for receiving said video data from said data bus if said KEYCMD signal corresponds to said ACK signal; and said slave device including:

means for receiving from said data bus said slave address and said command, means for recognizing said slave address as corresponding to said slave device, means for generating said ACK signal as a function of said command and a slave security key, and means for transmitting to said data bus said master address, said ACK signal, and said video data.

29. The system according to claim 28, wherein said master device further comprises means for inhibiting reception of said video data from said data bus if said KEYCMD signal does not correspond to said ACK signal.

30. The system according to claim 29, wherein said means for inhibiting includes a switch.

31. The system according to claim 28, wherein said master device is a receiver and said slave device is a peripheral device.

32. The system according to claim 28, wherein said master device is a peripheral device and said slave device is a receiver.

33. The system according to claim 28, wherein said master device is a first peripheral device and said slave device is a second peripheral device.

34. The system according to claim 28, wherein said video data is unencrypted and encoded and wherein said slave device comprises means for decoding said video data.

35. The system according to claim 28, wherein:
said master device further includes means for decrypting said video data according to an encryption key; and
said slave device further includes means for encrypting said video data according to said encryption key.

36. The system according to claim 35, wherein:
said master device further includes means for receiving said encryption key from said data bus; and
said slave device further includes means for transmitting said encryption key to said data bus.

37. A system for communicating video data comprising:
at least one master device having a master address;
at least one slave device having a slave address;
a data bus, coupled to said master device and to said slave device;
said master device including:
means for transmitting to said data bus said slave address and a command,
means for generating a KEYCMD signal as a function of said command and a master security key,
means for receiving from said data bus said master address and an ACK signal,
means for recognizing said master address as corresponding to said master device,
means for comparing said KEYCMD signal and said ACK signal, and
means for transmitting to said data bus said video data if said KEYCMD signal corresponds to said ACK signal; and
said slave device including:
means for receiving from said data bus said slave address, said command and said video data,
means for recognizing said slave address as corresponding to said slave device,
means for generating said ACK signal as a function of said command and a slave security key, and
means for transmitting to said data bus said master address and said ACK signal.

38. The system according to claim 37, wherein said master device further includes means for inhibiting transmission of said video data to said data bus if said KEYCMD signal does not correspond to said ACK signal.

39. The system according to claim 37, wherein:
said master device further includes means for encrypting said video data according to an encryption key; and
said slave device further includes means for decrypting said video data according to said encryption key.

40. The system according to claim 39, wherein:
said master device further includes means for transmitting said encryption key to said data bus; and
said slave device further includes means for receiving said encryption key from said data bus.

* * * * *